United States Patent
Westberg et al.

(10) Patent No.: US 10,652,400 B2
(45) Date of Patent: May 12, 2020

(54) BASE STATION, A WIRELESS DEVICE, AND METHODS THEREIN FOR CONTROLLING USER DATA TRAFFIC BETWEEN THE WIRELESS DEVICE AND A LOCAL CLOUD

(71) Applicant: Telefonaktiebolaget LM Ericsson (publ), Stockholm (SE)

(72) Inventors: Lars Westberg, Huddinge (SE); Hans Eriksson, Sollentuna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/080,817

(22) PCT Filed: Mar. 2, 2016

(86) PCT No.: PCT/SE2016/050164
§ 371 (c)(1),
(2) Date: Aug. 29, 2018

(87) PCT Pub. No.: WO2017/151025
PCT Pub. Date: Sep. 8, 2017

(65) Prior Publication Data
US 2019/0082057 A1    Mar. 14, 2019

(51) Int. Cl.
*H04M 15/00*    (2006.01)
*H04L 12/14*    (2006.01)
(Continued)

(52) U.S. Cl.
CPC .......... *H04M 15/852* (2013.01); *H04L 12/14* (2013.01); *H04L 12/1403* (2013.01);
(Continued)

(58) Field of Classification Search
CPC ............. H04M 15/852; H04M 15/853; H04M 15/8214; H04M 15/88; H04M 15/8207;
(Continued)

(56) References Cited

U.S. PATENT DOCUMENTS

2009/0232019 A1   9/2009 Gupta et al.
2012/0164974 A1*  6/2012 Eriksson .......... G06F 16/24552
                                                  455/406
(Continued)

FOREIGN PATENT DOCUMENTS

EP    2538719 A2    12/2012

OTHER PUBLICATIONS

International Search Report and Written Opinion of the International Searching Authority, PCT/SE2016/050164, dated Oct. 28, 2016, 12 pages.
(Continued)

*Primary Examiner* — Michael Y Mapa
(74) *Attorney, Agent, or Firm* — Sage Patent Group

(57) ABSTRACT

A base station method is provided to control user data traffic. A wireless device is associated with a limited volume of resources for user data traffic. When it remains resources in the limited volume associated the wireless device, the base station receives a first indicator from a core network node. The first indicator indicates that said user data traffic shall be routed to the local cloud. The base station routes the user data traffic over a split bearer. The split bearer comprises a first bearer between the base station and the local cloud in which said user data traffic is routed and a second bearer from the base station to a gateway node. In the second bearer a copy of said user data traffic is routed for measuring the volume of the user data traffic between the wireless device and the local cloud in relation to the limited volume.

15 Claims, 10 Drawing Sheets

(51) Int. Cl.
*H04W 4/24* (2018.01)
*H04W 36/00* (2009.01)
*H04W 8/08* (2009.01)
*H04W 76/15* (2018.01)
*H04L 29/08* (2006.01)
*H04W 88/08* (2009.01)

(52) U.S. Cl.
CPC ...... *H04L 12/1407* (2013.01); *H04L 67/1008* (2013.01); *H04L 67/327* (2013.01); *H04M 15/8214* (2013.01); *H04M 15/853* (2013.01); *H04M 15/88* (2013.01); *H04W 4/24* (2013.01); *H04W 8/08* (2013.01); *H04W 36/0022* (2013.01); *H04W 76/15* (2018.02); *H04W 88/08* (2013.01); *H04M 15/8207* (2013.01)

(58) Field of Classification Search
CPC ... H04W 36/0022; H04W 76/15; H04W 8/08; H04W 88/08; H04W 4/24; H04L 12/1407; H04L 12/1403; H04L 67/1008; H04L 67/327; H04L 12/14
USPC .................................................. 455/405–406
See application file for complete search history.

(56) References Cited

U.S. PATENT DOCUMENTS

| | | | |
|---|---|---|---|
| 2013/0029708 A1* | 1/2013 | Fox | H04W 28/08 455/509 |
| 2014/0043984 A1 | 2/2014 | Billau et al. | |
| 2015/0156082 A1 | 6/2015 | Kakadia et al. | |
| 2015/0181592 A1 | 6/2015 | Bindrim et al. | |
| 2015/0271087 A1* | 9/2015 | Yiu | H04L 47/35 370/230 |
| 2015/0334601 A1* | 11/2015 | Gao | H04W 28/18 370/329 |
| 2016/0234760 A1* | 8/2016 | Orlandi | H04W 48/14 |

OTHER PUBLICATIONS

VODAFONE: "Impact on Lawful Interception of Mobile Edge Computing", 3GPP TSG SA3-LI Meeting #55, Portland, USA, Oct. 28-30, 2014, SA3LI14-167, XP050895700, Retrieved from the Internet: URL:http://www.3gpp.org/ftp/tsg_sa/WG3_Security/TSGS3_LI/2014_55 Portland/ [retrieved on Oct. 30, 2014], 5 Pages.
Extended European Search Report for European Application No. EP 16892826.5 dated Aug. 12, 2019—10 Pages.
European Office action dated Feb. 4, 2020 for European Patent Application No. 16892826.5, 9 pages.

* cited by examiner

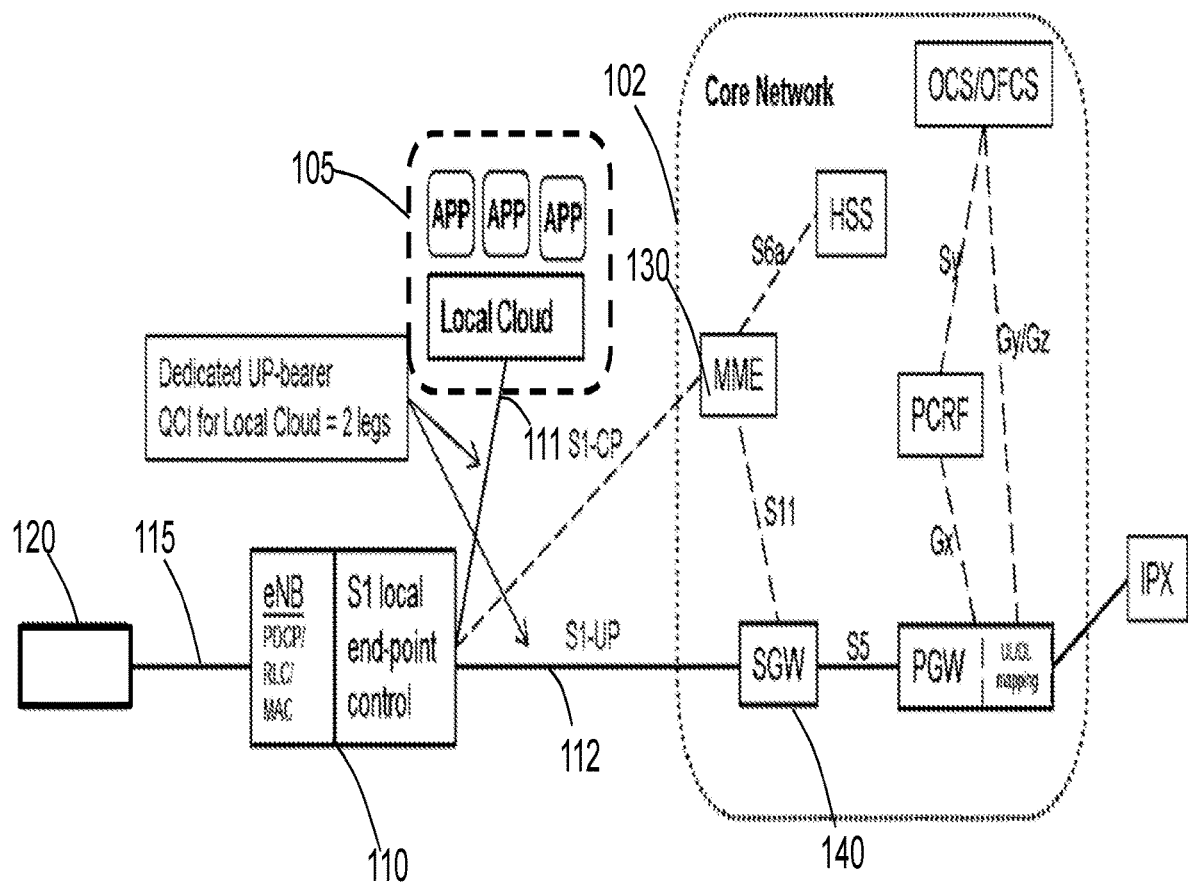

BASE STATION, A WIRELESS DEVICE, AND METHODS THEREIN FOR CONTROLLING USER DATA TRAFFIC BETWEEN THE WIRELESS DEVICE AND A LOCAL CLOUD

CROSS REFERENCE TO RELATED APPLICATIONS

This application is a 35 U.S.C. § 371 national stage application of PCT International Application No. PCT/SE2016/050164 filed on Mar. 2, 2016, the disclosure and content of which is incorporated by reference herein in its entirety.

TECHNICAL FIELD

Embodiments herein relate to a base station, a wireless device and methods therein. In particular, they relate to controlling user data traffic between the UE and a local cloud.

BACKGROUND

Wireless devises for communication are also known as e.g. User Equipments (UEs), mobile terminals, wireless terminals and/or mobile stations. Wireless devises are enabled to communicate wirelessly in a communication network such as a mobile network, sometimes also referred to as a wireless communications system, a cellular radio system or cellular networks. The communication may be performed e.g. between two mobile terminals, between a mobile terminal and a regular telephone and/or between a mobile terminal and a server, such as server providing video streaming service, via a Radio Access Network (RAN) and possibly one or more core networks, comprised within the communications network. A RAN is part of a wireless telecommunication system. It implements a radio access technology and it resides between a wireless device such as a mobile phone, a computer, or any remotely controlled machine and provides connection with its Core Network (CN).

Wireless devises may further be referred to as mobile telephones, cellular telephones, computers, or surf plates with wireless capability, just to mention some further examples. The wireless devises in the present context may be, for example, portable, pocket-storable, hand-held, computer-comprised, or vehicle-mounted mobile devices, enabled to communicate voice and/or data, via the RAN, with another entity, such as another wireless device or a server.

Some cellular communications networks cover a geographical area which is divided into cell areas, wherein each cell area is served by a base station, e.g. a Radio Base Station (RBS), which sometimes may be referred to as e.g. eNodeB (eNB), NodeB, B node, Base Transceiver Station (BTS), or AP (Access Point), depending on the technology and terminology used. The base stations may be of different classes such as e.g. macro eNodeB, home eNodeB or pico base station, based on transmission power and thereby also cell size. A cell is the geographical area where radio coverage is provided by the base station at a base station site. One base station, situated on the base station site, may serve one or several cells. Further, each base station may support one or several communication technologies. The base stations communicate over the air interface operating on radio frequencies with the wireless devices within range of the base stations. The base stations and wireless devices involved in communication may also be referred to as transmitter-receiver pairs, where the respective transmitter and receiver in a pair may refer to a base station or a wireless device, depending on the direction of the communication. In the context of this disclosure, the expression Downlink (DL) is used for the transmission path from the base station to a mobile terminal The expression Uplink (UL) is used for the transmission path in the opposite direction i.e. from the wireless device to the base station.

Universal Mobile Telecommunications System (UMTS) is a third generation mobile communication system, which evolved from the Global System for Mobile Communications (GSM), and is intended to provide improved mobile communication services based on Wideband Code Division Multiple Access (WCDMA) technology. UMTS Terrestrial Radio Access Network (UTRAN) is essentially a radio access network using wideband code division multiple access for communication with terminals. The 3GPP has undertaken to evolve further the UTRAN and GSM based radio access network technologies.

In 3rd Generation Partnership Project (3GPP) Long Term Evolution (LTE), base stations, which may be referred to as eNodeBs or even eNBs, may be directly connected to one or more core networks.

Pre-paid and on-line charging is very important for customers buying pre-paid subscriptions for their user equipments. The services are paid in advanced for a given bucket size, and the service is valid until the quota of the bucket has been consumed. This is known solutions for people skilled in charging/billing systems. In FIG. 1, the traffic between a client of a wireless devises and a Local Cloud is depicted and marked with a dashed line. The Local Cloud has a server that may provide high Quality of Experience (QoE)-streaming to the clients QOE-server, i.e. a local Content Distribution Network (CDN) server or a gaming server. A CDN is a large distributed system of servers deployed in multiple data centers. Those distributed CDN serves content to end-users with high availability and high performance. A Protocol Proxy in the Local Cloud is used to interact with communication between the UE and the application server on Internet, and the Local cloud internal functions such as a QoE server that determines the best way how and when data is to be sent to the UE Terminal. An example of an application proxy a protocol proxy such as Transmission Control Protocol (TCP)- or Hypertext Transfer Protocol (HTTP) proxy that is extended with functions that also communicates with the network in order to determine how to achieve an optimal QoE delivery. A Hypervisor in the Local Cloud is used to allow virtualized functions to be deployed and run on the physical computing infrastructure in the Local Cloud. "R" in the Local Cloud is the site Router and it is used to establish a connection path to network node 10, i.e. to the S1-local-end-point function/black small box in the picture. S1U represents the GPRS Tunneling Protocol (GTP) Layer 2 tunneling user plane of the 3GPP defined S1 reference point and S1C is the control plane of the 3GPP defined S1 reference point that is used to set-up, remove GTP tunnels, as well as transferring mobility events and status in relation to the user terminal movements.

A problem in a Mobile-Edge Architecture is that a complete core-network need to be deployed to support the charging function. One solution is to copy local traffic in a network node 10 that is located in the user plane path between the eNB and the Layer 2 GTP termination of S1 user plane reference point where all user data sent and received in a Radio Access Bearer (RAB) is copied to a more centralized core network where the charging function is located. The charging functions may be located in the Serving (S)/PDN (P) S/P-Gateway (GW), S or in a combined node. The charging systems may e.g. include Online Charging System (OCS) and Offline Charging System (OFCS).

The Data Centre in FIG. 1 represents a centrally located site where the core network and other network functions are deployed, such as Policy Control and Charging (PCC) functions that defines per user traffic enforcement rules that the PGW shall enforce, and if out of quota take appropriate action according the described policy, e.g. redirect of users traffic to an Out of quota WEB server.

Both directions of the copied traffic is sent upstream so the S/P-GW detects the direction of the copied data such that the interfaces for Lawful Interception (LI) and charging act correctly on the copied streams and indicate appropriate direction to external LI-GW and Policy and Charging Control (PCC) functions.

Subscriptions are usually limited by data volume also referred to as data buckets, that the end-user can consume during e.g. a month, i.e. the transferred data volume e.g. in Mbytes over an access network. A byte-counter is shown as an entity for counting the consumed data volume for the user, i.e. the subscriber. It may be two different counters, one per direction.

When the subscriber has reached the quota, the user's traffic will be forced routed to Out-of-quota WEB-server. The WEB-server will inform the user that the quota is reached, i.e. bucket limit is reached, when the user requests a WEB-page on Internet.

The breakout function to steer traffic to a Local Cloud may be based on 5-tuple, or parts of it, from the user data packet or be done on L2-parameters such as e.g. Packet Data Convergence Protocol (PDCP) or GPRS Tunneling Protocol (GTP) parameters. GTP is a group of IP-based communications protocols used to carry General Packet Radio Service (GPRS) within GSM, UMTS and LTE networks. Also S1-control parameters may be used to determine function of the local break-out function. S1 is a standardized interface between eNB, also referred to as base station, and the Evolved Packet Core (EPC).

U.S. Pat. No. 9,071,450 B22 discloses a system for charging and policy for services at the edge of a mobile data network. This document assumes that the optimization function has its own charging GW function. This means that it is multiplying the interfaces to the charging function. In this solution with multiple sources reporting charging data there is a coordination and management problem that require more work in configuring all interfaces and also functional extensions in the charging system to coordinate several sources reporting; in case the user is mobile.

U.S. Pat. No. 9,173,081 discloses a system and method for enabling interactions between a policy decision point and a charging system. This document relates to a system for managing group-based charging for network usage and spending in a communications network. In an embodiment of this system, a method may include receiving a charging event that identifies a user equipment from a charging component, applying the charging event, and determining whether the user equipment identified in the charging event is a member of the group of user equipment's identified in a subscription request. A problem with this solution is that the policy decision point that communicates with the charging system and policy decision point needs to be distributed. This solution will increase the complexity in data correlation that all distributed points have the same policy for a mobile user, i.e. it is an increased risk of errors.

SUMMARY

It is therefore an object of embodiments herein to improve the way of controlling charging of subscribers in a communications network, which subscribers have a limited data volume for use.

It is a further object of embodiments herein to unravel problems described above and described below in the detailed description.

According to a first aspect of embodiments herein, the object is achieved by a method performed by a base station for controlling user data traffic between a wireless device and a local cloud. The wireless device is associated with a limited volume of resources for user data traffic. When it remains resources in the limited volume associated the wireless device, the base station receives a first indicator from a core network node. The first indicator indicates that said user data traffic shall be routed to the local cloud. The base station routes the user data traffic over a split bearer. The split bearer comprises a first bearer between the base station and the local cloud in which said user data traffic is routed. The split bearer further comprises a second bearer from the base station to a gateway node. In the second bearer a copy of said user data traffic is routed for measuring the volume of the user data traffic between the wireless device and the local cloud in relation to the limited volume for user data traffic associated with the wireless device.

According to a second aspect of embodiments herein, the object is achieved by a method performed by a core network, for controlling user data traffic between a wireless device and a local cloud. The wireless device is associated with a limited volume of resources for user data traffic. The core network node obtains information from a gateway node. The information relates to that that it remains resources in the limited volume associated with the wireless device.

The core network node sends a first indicator to the base station. The first indicator indicates that said user data traffic shall be routed to the local cloud, and the first indicator instructs the base station to route the user data traffic over a split bearer. The split bearer comprises a first bearer between the base station and the local cloud in which said user data traffic is routed.

The split bearer further comprises a second bearer from the base station to the gateway node. In the second bearer a copy of said user data traffic is routed for measuring the volume of the user data traffic between the wireless device and the local cloud in relation to the limited volume for user data traffic associated with the wireless device.

According to a third aspect of embodiments herein, the object is achieved by a base station for controlling user data traffic between a wireless device and a local cloud. The wireless device is configured to be associated with a limited volume of resources for user data traffic. The base station is configured to:

When it remains resources in the limited volume associated the wireless device 120, receive a first indicator from a core network node, which first indicator is configured to indicates that said user data traffic shall be routed to the local cloud.

Route the user data traffic over a split bearer.

The split bearer is configured to comprise a first bearer 111 between the base station and the local cloud in which said user data traffic is to be routed.

The split bearer further is configured to comprise a second bearer from the base station to a gateway node. In the second bearer a copy of said user data traffic is to be routed for measuring the volume of the user data traffic between the wireless device and the local cloud in relation to the limited volume for user data traffic associated with the wireless device.

According to a forth aspect of embodiments herein, the object is achieved by a core network node for controlling user data traffic between a wireless device and a local cloud. The wireless device is associated with a limited volume of resources for user data traffic. The core network node is configured to:

Obtain from a gateway node, information that it remains resources in the limited volume configured to be associated with the wireless device.

Send a first indicator to the base station. The first indicator is configured to indicate that said user data traffic shall be routed to the local cloud, and which first indicator adapted to instructs the base station to route the user data traffic over a split bearer.

The split bearer is configured to comprise a first bearer between the base station and the local cloud in which said user data traffic is to be routed.

The split bearer further comprises a second bearer from the base station to the gateway node. In the second bearer a copy of said user data traffic is to be routed for measuring the volume of the user data traffic between the wireless device and the local cloud in relation to the limited volume for user data traffic configured to be associated with the wireless device.

Embodiments herein enable online charging control when local cloud deployments are done. This is since an indicator is sent to the base station such that the base station is enabled to control user data traffic between the wireless device and a local cloud by setting up a split bearer from the base station. The split bearer comprises a first bearer to the local cloud. The bearer to the gateway node is kept as the second bearer. All user data traffic of the wireless device is routed to the local cloud over the first bearer and a copy is sent in to the gateway node to enable charging control of the traffic.

BRIEF DESCRIPTION OF THE DRAWINGS

Examples of embodiments herein are described in more detail with reference to attached drawings in which:

FIG. 2b is a schematic block diagram illustrating embodiments of a communications network.

DETAILED DESCRIPTION

Figure 1:
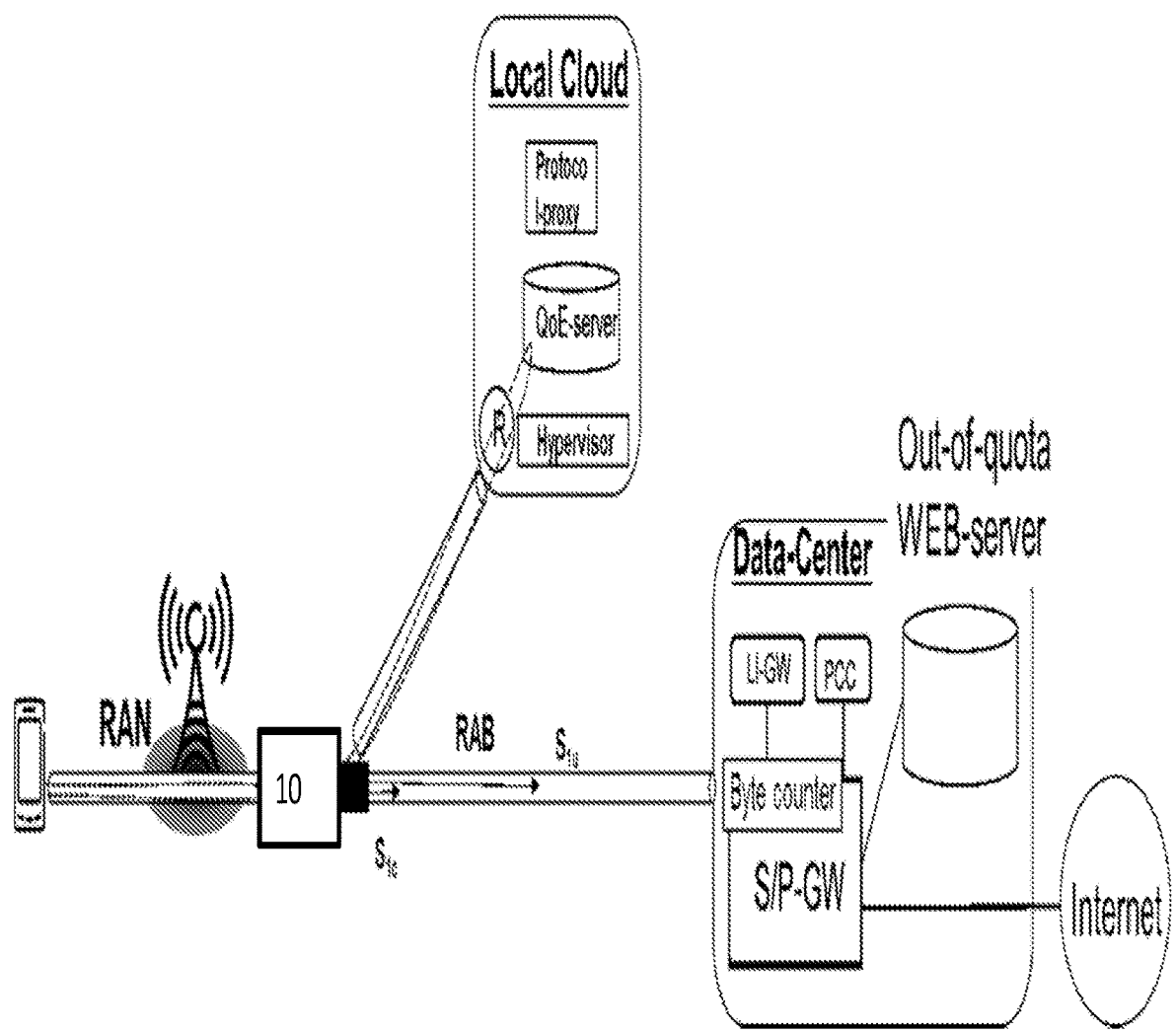
FIG. 1 is a schematic block diagram illustrating bearers of a communications network according to prior art.

As part of developing embodiments herein a problem was first identified and will be discussed below:

A problem that embodiments herein address is to have minimal impact on 3GPP architecture in how to steer user data traffic towards a local cloud such as an Mobile Edge Cloud (MEC) node below the UE IP point of presence in the operators network, and how to disconnect traffic from MEC node. The main benefits to deploy applications on a MEC platform distributed in the network topology is to reduce latency for specific applications as augmented reality or scenarios for remote control of object, industry robots or in case of week and costly transport backhaul where prepopulation of media servers in the MEC is done to give users high value user experience in those scenarios.

Please note that MEC may also be referred to as Mobile Edge Computing.

Another problem is that for on-line charging there is no solution for how traffic policies are enforced in the local cloud such as the MEC, e.g. how to redirect user data traffic due to out of data bucket quota, and how to do this without a major change of the 3GPP architecture, i.e. that is if not moving the S/PGW to the edge, which would drive an increased cost to have EPC distributed at many physical locations.

MEC offers application developers and content providers cloud-computing capabilities and an IT service environment at the edge of a mobile network. MEC provides ultra-low latency and high bandwidth as well as real-time access to radio network information that may be leveraged by applications. By MEC, operators can open their RAN edge to authorized third-parties, allowing them to flexibly and rapidly deploy applications and services towards mobile subscribers, enterprises and vertical segments.

Please note that the terms local cloud and MEC may be used interchangeably.

Embodiments herein relate to controlling charging for user data traffic to a local cloud.

Embodiments herein enable online charging control below the UE IP point of presence in the operators network, also referred to as below a Packet Data Network GW (PDG) and below the Gi reference point, when local cloud deployments are done. Embodiments herein set for minimal changes to 3GPP architecture where an indicator such as e.g. a specific QCI value is used to set up a split bearer from the base station that sets up a first bearer to a local cloud, and at the same time keep the bearer to the gateway node such as an S1 bearer to S/P-GW, as a second bearer. All wireless device user data traffic is routed to the local cloud bearer and a copy is sent in the uplink direction to the gateway node such as the S/P-GW to enable charging control of the traffic.

A PDG Gi reference point is a IP routing point of UE IP packets and it is above the mobility anchor and IP point of presence for the wireless device. All bearers in 3GPP is layer 2 tunnels below the IP routing point, i.e. Gi. The reference point Gi lies between the Packet Data Network GW (PGW) and the external Packet Data Network (PDN). As an example, Gi lies between the PGW and external IP networks. GGSN is the GW for 2G-3G systems, from 4G EPC system it is called PGW.

In 3GPP there is an Evolved Packet System (EPS) bearer definition that is defined by Radio bearer, S1 Bearer (RBS to SGW) and a S5/S8 bearer (between SGW and PGW). Each node in 3GPP has an EPS bearer context description about the sub bearers described and other session related information including QCI. The split bearer has one more leg than any other bearer definitions.

Figure 2A:
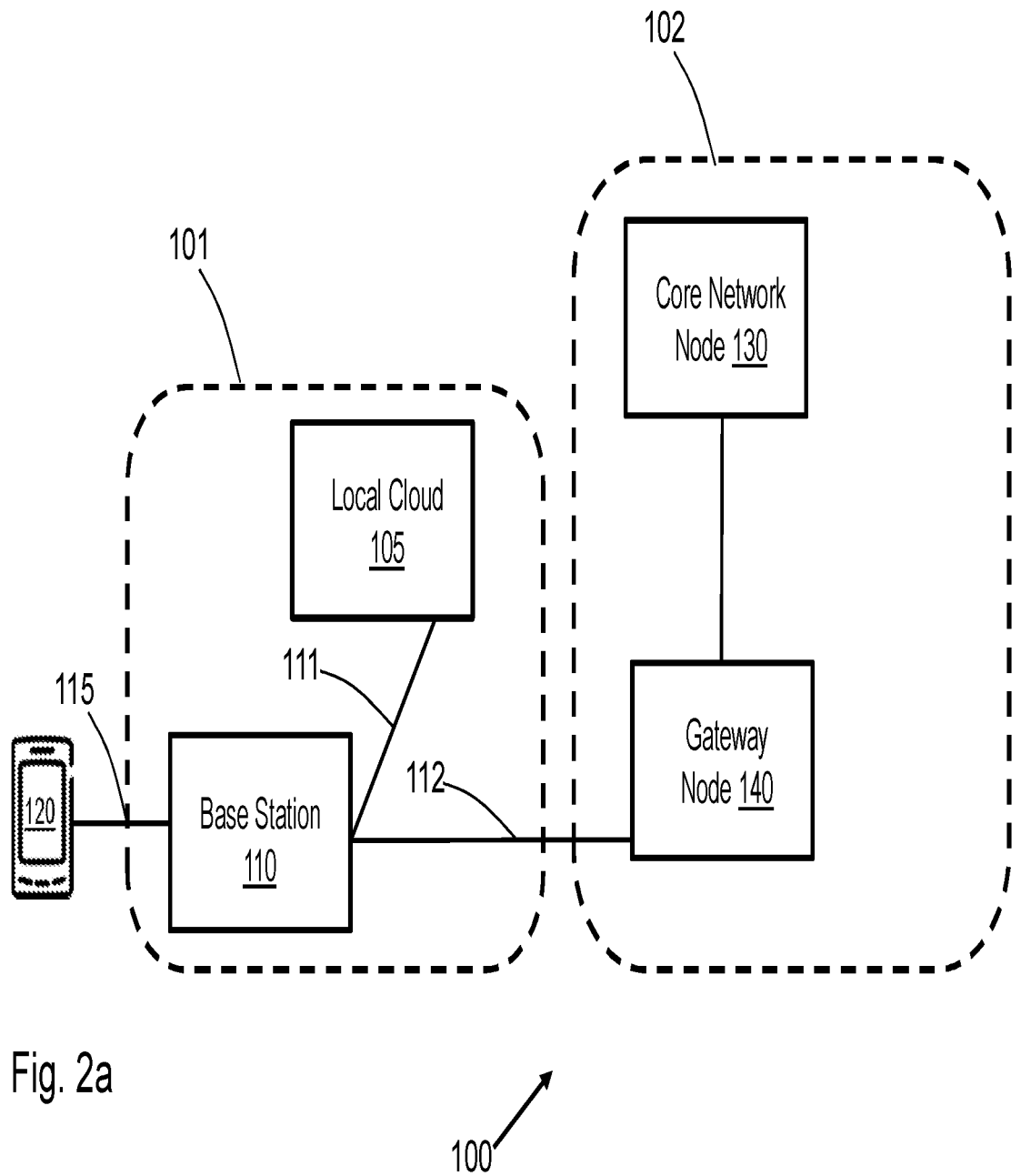
FIG. 2a is a schematic block diagram illustrating embodiments of a communications network.

FIG. 2a depicts an example of a communications network 100 in which embodiments herein may be implemented. A more detailed example of the communications network 100 is shown in FIG. 2b. The communications network 100 may comprise any one or more out of: LTE, 5th generation mobile network (5G), GSM, GSM EDGE Radio Access Network (GERAN), Wi Fi, Wireless Local Area network (WLAN), WiMax, Code Divisional Multiple Access (CDMA) 2000, LTE-NX, Massive MIMO systems etc. EDGE is the abbreviation for Enhanced Data Rates for GSM Evolution, and LTE-NX means next-generation mobile radio access technology for 5G and future evolution of mobile systems access networks.

The a communications network 100 comprises a radio access network 101 and a core network 102.

The communications network 100 further comprises a local cloud 105. The local cloud 105 according to embodiments herein comprises a cloud infrastructure that may be deployed distributed in local areas close to or collocated with a cell site e.g. an RBS site such as the base station 110, an RBS Hub site or central office site. The central office site is typically a distributed site to local city areas where operators deploys telephony equipment and in this document also equal a distributed cloud data center. When the local cloud 105 is a MEC, the local cloud 105 may be collocated with some parts of the base station 110 such as e.g. in PDCP and S1-end-point termination function. S1 is the interface between a base station such as eNB and the core network node Mobility Management Entity (MME) and S-GW.

A plurality of network nodes operate in the radio access network 101 comprised in the wireless communications network 100 whereof one, a base station 110 is depicted in FIG. 2. The base station 110 may for example be an eNodeB, a NodeB, a Home Node B, a Home eNode B, a WiFi Access Point (AP), future evolved eNodeB or any other network node capable to serve a wireless device in a wireless communications network.

One or more wireless devices are operable in the communications network 100, whereof one a wireless device 120 is shown in FIGS. 2a and 2b.

The term wireless device when used herein may e.g. refer to a mobile terminal, a wireless device, a mobile wireless terminal or a wireless terminal, a mobile phone, a target device, a computer such as e.g. a laptop, a Personal Digital Assistants (PDAs) or an iPad, a tablet computer, sometimes referred to as a surf plate, with wireless capability, a smart phone, Laptop Embedded Equipment (LEE), Laptop Mounted Equipment (LME), Universal Serial Bus (USB) dongles or any other radio network units capable to communicate over a radio link in a wireless communications network.

A core network node 130 and a gateway node 140 operate in the core network 102. The core network node 130 may e.g. be an MME or Policy and Charging Rules Function (PCRF). The gateway node 140 may e.g. be a GGSN, SGSN, PGW and/or an SGW.

S6a It enables transfer of subscription and authentication data for authenticating/authorizing user access to the evolved system (AAA interface) between MME and HSS.

S11 Reference point between MME and Serving GW. For example establishment of a new EPS bearer the MME sends a request to the SGW over the S11 reference pointSy The Sy reference point resides between the PCRF and the On-line Charging System (OCS). The Sy reference point enables transfer of policy counter status information relating to subscriber spending from OCS to PCRF Gx The Gx reference point resides between the PCRF and the policy enforcement function (PCEF) in the PGW. The Gx reference point enables the PCRF to have dynamic control over the Policy Control and Charging (PCC) behavior at a PGW.

Gy/Gz The Gy reference point allows online credit control for service data flow based charging, The Gy reference point resides between the OCS and the PCEF. The Gz reference point resides between the PCEF and the OFCS. The Gz reference point enables transport of service data flow based offline charging information.

S5 S5 provides user plane tunnelling and tunnel management between Serving GW and PDN GW. It is used for Serving GW relocation due to UE mobility and if the Serving GW needs to connect to a non-collocated PDN GW for the required PDN connectivity.

S1UP Reference point between eNodeB and Serving GW for the per bearer user plane tunnelling and inter eNodeB path switching during handover.

S1CP Reference point for the control plane protocol between eNodeB and MME

APP Application. Typically an end-user application

MME Mobility Management Entity

OCS On-line Charging System and

OFCS Off-line Charging system

IPX Internet exchange point where the operator connects to Internet

PCRF Policy and Charging Rules Function

PDCP/RLC/MAC Radio layer protocols: Packet Data Convergence Protocol, Radio Link Control and Medium Access Control. The PDCP as the top level radio layer connects to the S1 local end-point control function that maps the data packet between the radio and the S1 reference point.

The functionality of base station 110 according to embodiments herein may comprise a termination point of the S1 reference point, referred to as an S1 local end-point control in this document. The function of the base station 110 such as e.g. the S1 end-point, according to some embodiments herein is that it implements a split-bearer function with the following behavior:

At bearer set-up and in the case an indicator for the bearer request is indicating routing to the local cloud 105, an additional bearer is established to the local cloud. The complete bearer such as a n EPS bearer may now be defined as the radio bearer 115 between a wireless device 120 and the base station 110 and a split bearer such as a split S1 User Plane bearer with 2 legs, a first bearer 111 and a second bearer 112 as shown in FIGS. 2a and 2b.

All User plane traffic from the wireless device 120, e.g. up link and downlink is copied into the user plane S1 bearer that goes to the gateway node 140 such as e.g. an SGW.

At bearer modification when the indicator such as e.g. a QCI value is changed from local cloud to a different value, the first bearer 111 of the split-bearer is removed, and the second bearer 112 is established according to normal 3GPP message sequences and procedures.

At bearer modification when the indicator such as a QCI value, again is equal to local cloud the first bearer 111 of the split bearer is established again.

The function of the gateway node 140 is that when a connection to the local cloud is established and all user data traffic on this first bearer is forwarded to the local cloud, and a copy of the packets are sent in the uplink direction of a second bearer, i.e. the other part of the split-bearer up to the gateway node 140 such as e.g. SGW and PGW, that will handle the wireless device 120 traffic according to a policy defined, e.g. bucket count and Charging Data Record (CDR) reporting to the charging system for the subscription related to the wireless device. During the data plane phase when user data traffic of the wireless device 120 is copied to the gateway node 140 such as e.g. SGW and PGW, and when the gateway node 140 e.g. by means of a gateway policy, such as a PGW policy, detects Out of quot" for this subscription related to the wireless device 120, a message such as an update bearer Request is sent to the core network node 130 such as the MEE to modify the Split bearer to a normal bearer e.g. as defined in a subscriber profile of the wireless device 120. The normal bearer is in the most cases a default bearer, but also another dedicated bearer with a different indicator, e.g. a different QCI value than local cloud 105 may be used.

The function of the core network node 130 according to embodiments herein is to send indicators e.g. by sending a bearer modification request, comprising a QCI value that is same as, or different from the Local Cloud type, to the base station 110 indicating whether or not a user data traffic related to the wireless device shall be routed to the cloud 105. If the bearer modification request is successful the base station 110 may reply to the core network 102 such as the core network node 130 about the successful modification. In case of any error also that is reported to the core network node 130 that may try to make the bearer modification request once more or try to connect to an alternative access if available.

An optional additional function in the gateway node 140 such as the PGW is to make an Uplink and Downlink mapping, referred to as UL/DL mapping in FIG. 2*b*, so that copied packets are identified in the correct direction. When packets enter the gateway node 140 such as the PGW all packets are in the UL direction so a re-mapping may be needed. For pure volume based charging where both UL and DL volume are merged there is no need to make a re-mapping of the directions, so it is not mandatory to always do remapping. But for Lawful Interception (LI) it may still be needed to do the remapping, but it also depending on how the LI solution is implemented, if LI reporting is done from the gateway node 140 such as PGW or from the local cloud 105 itself.

As a legally sanctioned official access to private communications, LI is a security process in which a service provider or network operator collects and provides law enforcement officials with intercepted communications of private individuals or organizations.

A method for setting up bearers in a communications network 100 being congested, is performed by the base station 110 and the core network node 130. As an alternative, Distributed Nodes (DN), and functionality, e.g. comprised in a cloud may be used for performing the methods.

A detailed description of attachment and EPS bearer set-up procedures is described in 3GPP TS 23.401 specification. All application servers in the 3GPP architecture must be placed above the PGW Gi reference point. The PDN Gateway (PGW) is an essential point in the network where charging, LI and mobility is anchored for each user attached in the communications network. The attachment procedure may comprise the message sequences when a user equipment such as the wireless device 130 detects a new network (e.g. after power on) the device will try to make connection (attach) to the network. As part of the attachment procedure the security keys between the UE and Network is exchanged and the subscriber identity is also authenticated if allowed to connect to the network. IP address of the device may also be sent to the UE during the attach procedure.

According to embodiments herein, an indicator such as a pre-defined 3GPP architecture parameter, e.g. a QCI value is used as a selection mechanism to detect that user data traffic shall be routed via a first bearer to the local cloud 105 which is below the UE IP point of presence in the operators network, and the user data traffic is copied into a second bearer 112 such as an EPS bearer in direction up to the gateway node such as e.g. PGW, i.e. a split bearer which may be a EPS split bearer. This new bearer may be pre-configured e.g. in subscriber data such as Home Subscriber Server (HSS) that this user shall always have a split dedicated bearer with the new indicator such as the QCI value, as the default bearer or as a secondary bearer. As an alternative, a dynamic bearer establishment is performed which may be UE initiated or network initiated, for a specified set of applications (APP)s that runs in the local cloud such as the MEC node. The network initiated request is according to current 3GPP specifications with one addition to use a specific parameter such as e.g. a different value on the QCI parameter so that the base station recognizes that this CQI value is different from other ordinary CQI values and makes use of that to detect and to redirect the user data traffic to the local cloud.

When the gateway node such as a PGW detects "out of data quota" for a subscription, a bearer release is initiated of that dedicated QCI bearer, and only the default EPS bearer remains. So when next user data packet such as e.g. HTTP_GET is received, the data packet is sent in the default bearer up to gateway that makes a redirect to the "charging out of quota WEB server" in the normal way. The Hypertext Transfer Protocol (HTTP) is an application protocol for distributed, collaborative, WEB based systems and is the foundation of data communication for the World Wide Web The HTTP GET method requests a representation of the specified resource used in the process to render a WEB page view visible for the end-user.

Figure 3:
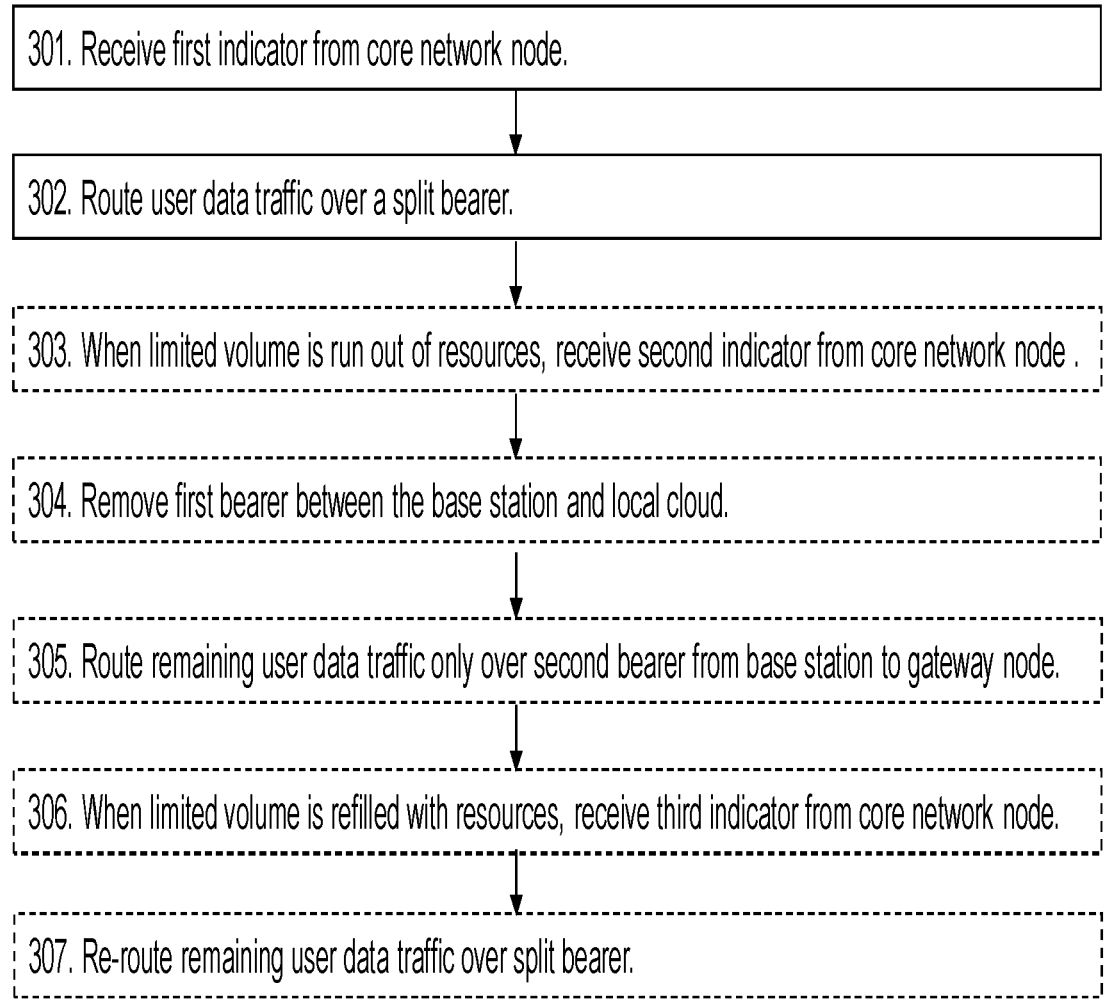
FIG. 3 is a flowchart depicting embodiments of a method in a base station.

Example embodiments of method performed by a base station 110, for controlling user data traffic between a wireless device 120 and a local cloud 105 will now be described with reference to a flowchart depicted in FIG. 3. The method will first be described in a more general way from the base station 110 perspective, and then from the core network node 130 perspective. The method will then be described more in detail and be exemplified further below. The wireless device 120 is associated with a limited volume of resources for user data traffic. In some embodiments, the local cloud 105 is represented by a Mobile Edge Cloud. The local cloud 105 may be located below an UE IP point of presence in an operators network, which operator serves the wireless device 120.

According to an example scenario, the user of the wireless device 120 may have purchased a pre-paid subscription for its wireless device 12, which subscription comprises a limited volume of resources for user data traffic. The wireless device 120 is thus associated to the limited volume of resources for user data traffic, which also may be referred to as configured for the limited volume of resources for user data traffic. Services are thus are paid in advanced for a given bucket size, i.e. limited volume of resources for user data traffic. The service is valid until the quota of the bucket has been consumed, i.e. until when the limited volume associated with the wireless device 120 is run out of resources.

According to embodiments herein the base station 110 is capable of controlling the routing of user data traffic between a wireless device 120 and a local cloud 105. The base station 110 decides whether or not to route the user data traffic to the local cloud 105, which depends on whether it remains resources in the limited volume associated the wireless device 120 or if the wireless device 120 has consumed all resources in the limited volume. The decision whether or not to route the user data traffic to the local cloud 105 is based on an indicator such as the QCI value in a message from the core network node 130 such as e.g. an MME. In an exemplary scenario it remains resources in the limited volume when the wireless device 120 starts to send and receive user data traffic.

The method comprises the following actions, which actions may be taken in any suitable order. Actions that are optional are presented in dashed boxes in FIG. 3.

Action 301

When it remains resources in the limited volume associated the wireless device 120, the base station 110 receives a first indicator from the core network node 130. The first indicator indicates that said user data traffic shall be routed to the local cloud 105.

The first indicator may be comprised in a bearer context information. The first indicator may e.g. be represented by a QCI with a first value indicating that said user data traffic shall be routed to the local cloud 105 over the first bearer 111, and a copy said user data traffic shall be routed to the gateway node 140 over the second bearer 112.

Action 302

When the base station 110 has identified the indication of first indicator the base station 110 accordingly routes the user data traffic over a split bearer.

The split bearer comprises a first bearer 111 between the base station 110 and the local cloud 105 in which said user data traffic is routed.

The split bearer further comprises a second bearer 112 from the base station 110 to a gateway node 140. In the second bearer 112 a copy of said user data traffic is routed. This is for measuring the volume of the user data traffic between the wireless device 120 and the local cloud 105 in relation to the limited volume for user data traffic associated with the wireless device 120. This makes it possible for the gateway node 140 to control the consumption of the limited volume and when it runs out of resources. If running out of resources, the gateway node 140 will inform the core network node 130, which in turn will inform the base station 100 to stop routing the ongoing user data traffic to the local cloud 105.

The user data traffic, routed over the second bearer 112 from the base station 110 to the gateway node 140, may in some embodiments comprise a fourth indicator. The fourth indicator indicates whether or not this is copied user data traffic. So in this case the fourth indicator will indicate that this is a copy wireless device's user data traffic.

Action 303

This action is optional. In the exemplary scenario all the resources in the limited volume are consumed during the ongoing user data traffic transmissions. This is detected by the gateway node 140 that reports it to the core network node 130 which in turn informs the base station by sending another indicator to the base station 110.

When the limited volume associated with the wireless device 120 is run out of resources, the base station 110 receives a second indicator from the core network node 130. The second indicator indicates that the first bearer 111 between the base station 110 and the local cloud 105 shall be removed.

Also the second indicator may be comprised in a bearer context information. The second indicator may e.g. be represented by a QCI with a second value indicating that the first bearer 111 between the base station 110 and the local cloud 105 shall be removed, and that the second bearer 112 shall remain.

Action 304

This action is optional. When the base station 110 has identified the indication of second indicator, the base station 110 accordingly removes the first bearer 111 between the base station 110 and the local cloud 105.

The base station 110 may in some embodiments send an indication to the local cloud that the wireless device 120 has disconnected from the local could so that any application referred to as APP in FIG. 2*b*, running in the local cloud 105 knows that wireless device 120 is not connected anymore. However, in some embodiments it is only a timeout in the application side.

Action 305

This action is optional. When the base station 110 has identified the indication of second indicator the base station 110 further routes remaining user data traffic only over the second bearer 112 from the base station 110 to the gateway node 140.

When the remaining user data traffic is routed over the second bearer 112 from the base station 110 to the gateway node 140, the remaining user data traffic may in some embodiments comprise a fourth indicator. The fourth indicator indicates whether or not this is copied user data traffic. So in this case the fourth indicator will indicate that this is not a copy wireless device's user data traffic.

In some embodiments, wherein the fourth indicator indicates that the user data traffic is not copied user data traffic. In these embodiments the base station 110 will implicitly know that that the remaining user data traffic on the second bearer 112 will not be further routed out from a core network. As an explicit alternative the fourth indicator may further indicate that the remaining user data traffic on the second bearer 112 will not be further routed out from a core network.

The fourth indicator may be comprised in a bearer context information. The fourth indicator may e.g. be represented by a QCI with a fourth value indicating whether or not this is copied user data traffic.

Action 306

This action is optional. In the exemplary scenario the user of the wireless device 120 refills resources e.g. by purchasing some more a pre-paid subscription for its wireless device 120, so that the subscription comprises a further limited volume of resources for user data traffic. This is detected by the core network node 130 which informs the base station 110 by sending a further indicator to the base station 110.

When the limited volume associated with the wireless device 120 is refilled with resources, the base station 110 receives a third indicator from the core network node 130. The third indicator indicates that the remaining user data traffic shall be re-routed to the local cloud 105.

The third indicator may be comprised in a bearer context information. The third indicator may e.g. be represented by a QCI with the first value indicating that said user data traffic shall be routed to the local cloud 105.

Action 307

This action is optional. This action is optional. When the base station 110 has identified the indication of second indicator, the base station 110 accordingly re-routes the remaining user data traffic over the split bearer.

The split bearer comprises a re-setup first bearer 111 between the base station 110 and the local cloud 105 in which said remaining user data traffic is routed.

The split bearer further comprises said second bearer 112 from the base station 110 to the gateway node 140. In the second bearer 112 a copy of said remaining user data traffic is routed. This is for measuring the volume of the user data traffic between the wireless device 120 and the local cloud 105 in relation to the limited volume of resources for user data traffic associated with the wireless device 120.

The user data traffic, routed over the second bearer 112 from the base station 110 to the gateway node 140, may in some embodiments comprise a fourth indicator. The fourth indicator indicates whether or not this is copied user data traffic. So in this case the fourth indicator will indicate that this is a copy wireless device's user data traffic.

As mentioned above, any one or more out of the first indicator, the second indicator, the third indicator and the fourth indicator may be comprised in a bearer context information such as e.g. when the indicator is an QCI. The bearer context information is build up in each node based on session control messages, for example Attach, Service request, Bearer modification, PDN connection request and release signalling sequences as defined in 3GPP.

Further any one or more out of the following alternative examples are applicable:

- The first indicator is represented by a QCI, with a first value indicating that said user data traffic shall be routed to the local cloud 105 over the first bearer 111, and a copy said user data traffic shall be routed to the gateway node 140 over the second bearer 112. For example the QCI value 169 may be used to indicate that it is a split bearer with mission critical delay requirements. More variants is also considered where other characteristics may be combined with the split bearer where QCI value 170 may be used to indicate a split bearer but with characteristics "use max capacity for ultra-fast object transmission over radio".
- The second indicator represented by a QCI with a second value indicating that the first bearer 111 between the base station 110 and the local cloud 105 shall be removed, and that the second bearer 112 shall remain. The QCI value 9 may be used in this case indicating a default bearer without a split bearer connection to local cloud.
- The third indicator is represented by a QCI with the first value indicating that said user data traffic shall be routed to the local cloud 105. The first value is here the same as above and may be a QCI value of for example 169.
- The fourth indicator is represented by a QCI with a fourth value indicating whether or not this is copied user data traffic. Any QCI value of 169 or 170 or future use of QCI value used for local cloud may be used to also indicate to the core network that the packets received is copied data packets.

Figure 4:
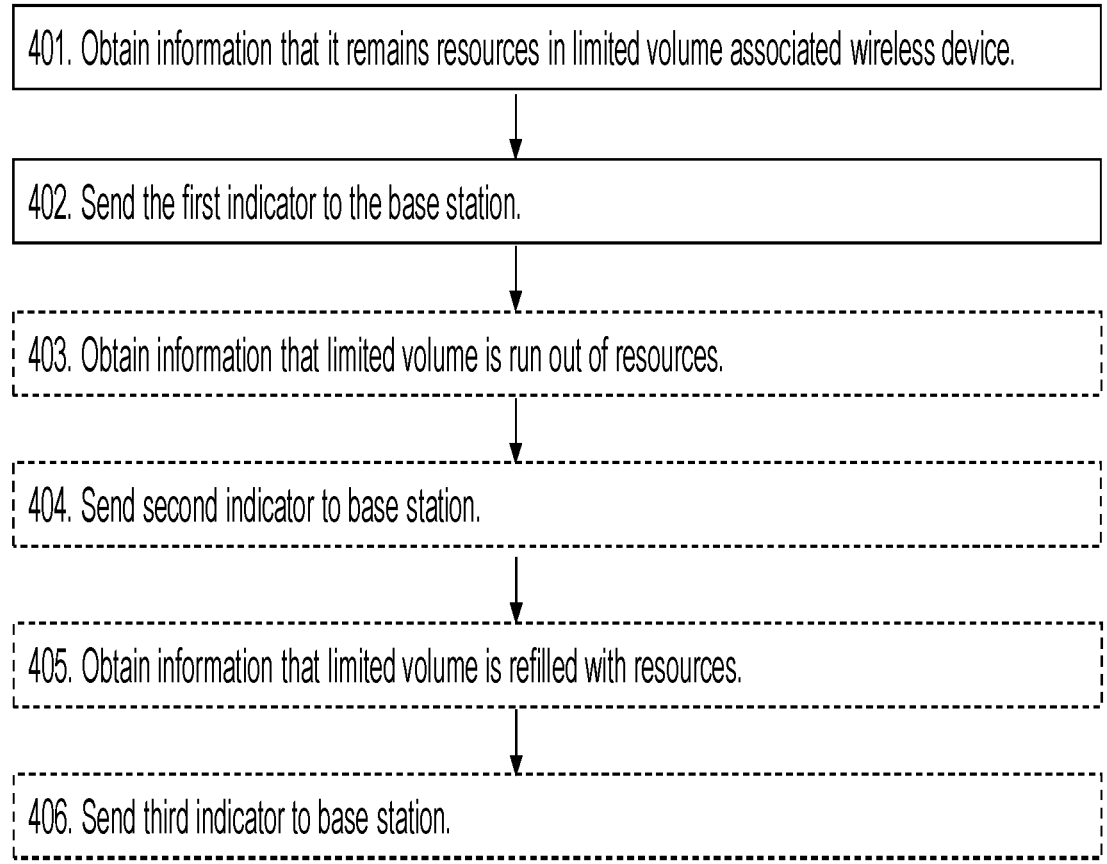
FIG. 4 is a flowchart depicting embodiments of a method in a core network node.

The method will now be described from the core network node 130 perspective. Please consider the example scenarios described above. Example embodiments of a method performed by a core network node 130, for controlling user data traffic between a wireless device 120 and a local cloud 105, will now be described with reference to a flowchart depicted in FIG. 4. As mentioned above the wireless device 120 is associated with a limited volume of resources for user data traffic, the method comprising.

The method comprises the following actions, which actions may be taken in any suitable order. Actions that are optional are presented in dashed boxes in FIG. 4.

Action 401

According to the example scenario, the user of the wireless device 120 may have purchased a pre-paid subscription for its wireless device 12, which subscription comprises the limited volume of resources for user data traffic. In an exemplary scenario it remains resources in the limited volume when the transmission of the user data traffic is initiated and the core network node 130 is notified accordingly.

Thus the core network node 130 obtains from the gateway node 140, information that it remains resources in the limited volume associated the wireless device 120, Action 402

To enable the base station 110 to control the route the user data traffic between the wireless device 120 and the local cloud 105, the base station 110 is informed that it remains resources in the limited volume associated the wireless device 120. Therefore the core network node 130 sends the first indicator to the base station 110. The first indicator indicates that said user data traffic shall be routed to the local cloud 105. The indicator instructs the base station 110 to route the user data traffic over a split bearer.

The split bearer comprises a first bearer 111 between the base station 110 and the local cloud 105 in which said user data traffic is routed.

The split bearer further comprises a second bearer 112 from the base station 110 to the gateway node 140. In the second bearer 112 a copy of said user data traffic is routed, for measuring the volume of the user data traffic between the wireless device 120 and the local cloud 105 in relation to the limited volume for user data traffic associated with the wireless device 120.

The first indicator may be comprised in a bearer context information. The first indicator may e.g. be represented by a QCI with a first value indicating that said user data traffic shall be routed to the local cloud 105 over the first bearer 111, and a copy said user data traffic shall be routed to the gateway node 140 over the second bearer 112.

The user data traffic, routed over the second bearer 112 from the base station 110 to the gateway node 140, may in some embodiments comprise a fourth indicator. The fourth indicator indicates whether or not this is copied user data traffic. So in this case the fourth indicator will indicate that this is a copy wireless device's user data traffic.

Action 403

This action is optional. In the exemplary scenario all the resources in the limited volume are consumed during the ongoing user data traffic transmissions. This is detected by the gateway node 140 that reports it to the core network node 130

The core network node 130 therefore obtains from the gateway node 140, information that the limited volume associated with the wireless device 120 is run out of resources.

Action 404

This action is optional. The core network node 130 will in turn inform the base station 110 by sending another indicator to the base station 110. Therefore the core network node 130 sends a second indicator to the base station 110. The second indicator indicates that the first bearer 111 between the base station 110 and the local cloud 105 shall be removed.

The second indicator instructs the base station 110 to remove the first bearer 111 between the base station 110 and the local cloud 105, and route the remaining user data traffic only over the second bearer 112 from the base station 110 to the Gateway node 140.

Also the second indicator may be comprised in a bearer context information. The second indicator may e.g. be represented by a QCI with a second value indicating that the first bearer 111 between the base station 110 and the local cloud 105 shall be removed, and that the second bearer 112 shall remain.

When the remaining user data traffic is routed over the second bearer 112 from the base station 110 to the gateway node 140, the remaining user data traffic may in some embodiments comprise a fourth indicator. The fourth indicator indicates whether or not this is copied user data traffic. So in this case the fourth indicator will indicate that this is not a copy wireless device's user data traffic.

In some embodiments, the fourth indicator indicates that the user data traffic is copied user data traffic. In these embodiments the base station 110 will implicitly know that that the remaining user data traffic on the second bearer 112 will not be further routed out from a core network. As an explicit alternative the fourth indicator may further indicate that the remaining user data traffic on the second bearer 112 will not be further routed out from a core network.

The fourth indicator may be comprised in a bearer context information. The fourth indicator may e.g. be represented by a QCI with a fourth value indicating whether or not this is copied user data traffic.

Action 405

This action is optional. In the exemplary scenario the user of the wireless device 120 refills resources e.g. by purchasing some more a pre-paid subscription for its wireless device 120, so that the subscription comprises a further limited volume of resources for user data traffic. This is detected by the core network node 130 which informs the base station 110 by sending a further indicator to the base station 110. It is detected e.g. by receiving the information from the charging system, alternative implementation may be done, but is not relevant for this document.

The core network node 130 obtains from the gateway node 140, e.g. implicitly, information that the limited volume associated with the wireless device 120 is refilled with resources and that the received traffic is copied traffic from the split bearer connection to the local cloud 105.

For example, the core network 102 informs the RAN 101 and GW to setup a split bearer and when that is done the core network 102 gets an implicit indication that this is done. There may also be explicit 3GPP signalling as a response to the bearer modification request that the core network sends to setup the split bearer.

Action 405

This action is optional. When obtaining from the gateway node 140, information that the limited volume associated with the wireless device 120 is refilled with resources, the core network node 130 sends a third indicator to the base station 110. The third indicator indicates that the remaining user data traffic shall be re-routed to the local cloud 105.

The third indicator instructs the base station 110 to re-route the remaining user data traffic over the split bearer.

The split bearer comprises a re-setup first bearer 111 between the base station 110 and the local cloud 105 in which said remaining user data traffic is routed.

The split bearer further comprises said second bearer 112 from the base station 110 to the Gateway node 140, in which second bearer 112 a copy of said remaining user data traffic is routed. This is for measuring the volume of the user data traffic between the wireless device 120 and the local cloud 105 in relation to the limited volume of resources for user data traffic associated with the wireless device 120.

The third indicator may be comprised in a bearer context information. The third indicator may e.g. be represented by a QCI with the first value indicating that said user data traffic shall be routed to the local cloud 105.

The user data traffic, routed over the second bearer 112 from the base station 110 to the gateway node 140, may in some embodiments comprise a fourth indicator. The fourth indicator indicates whether or not this is copied user data traffic. So in this case the fourth indicator will indicate that this is a copy wireless device's user data traffic.

As mentioned above, any one or more out of the first indicator, the second indicator, the third indicator and the fourth indicator may be comprised in a bearer context information.

Further any one or more out of the following alternative examples are applicable: The first indicator is represented by a Quality Of Service, QoS, Class Identifier, QCI, with a first value indicating that said user data traffic shall be routed to the local cloud 105 over the first bearer 111, and a copy said user data traffic shall be routed to the gateway node 140 over the second bearer 112.

The second indicator represented by a QCI with a second value indicating that the first bearer 111 between the base station 110 and the local cloud 105 shall be removed, and that the second bearer 112 shall remain.

The third indicator is represented by a QCI with the first value indicating that said user data traffic shall be routed to the local cloud 105.

The fourth indicator is represented by a QCI with a fourth value indicating whether or not this is copied user data traffic.

As mentioned above, the methods described above will now be exemplified and described more in detail. The description below may refer to any embodiment above.

Figure 5:
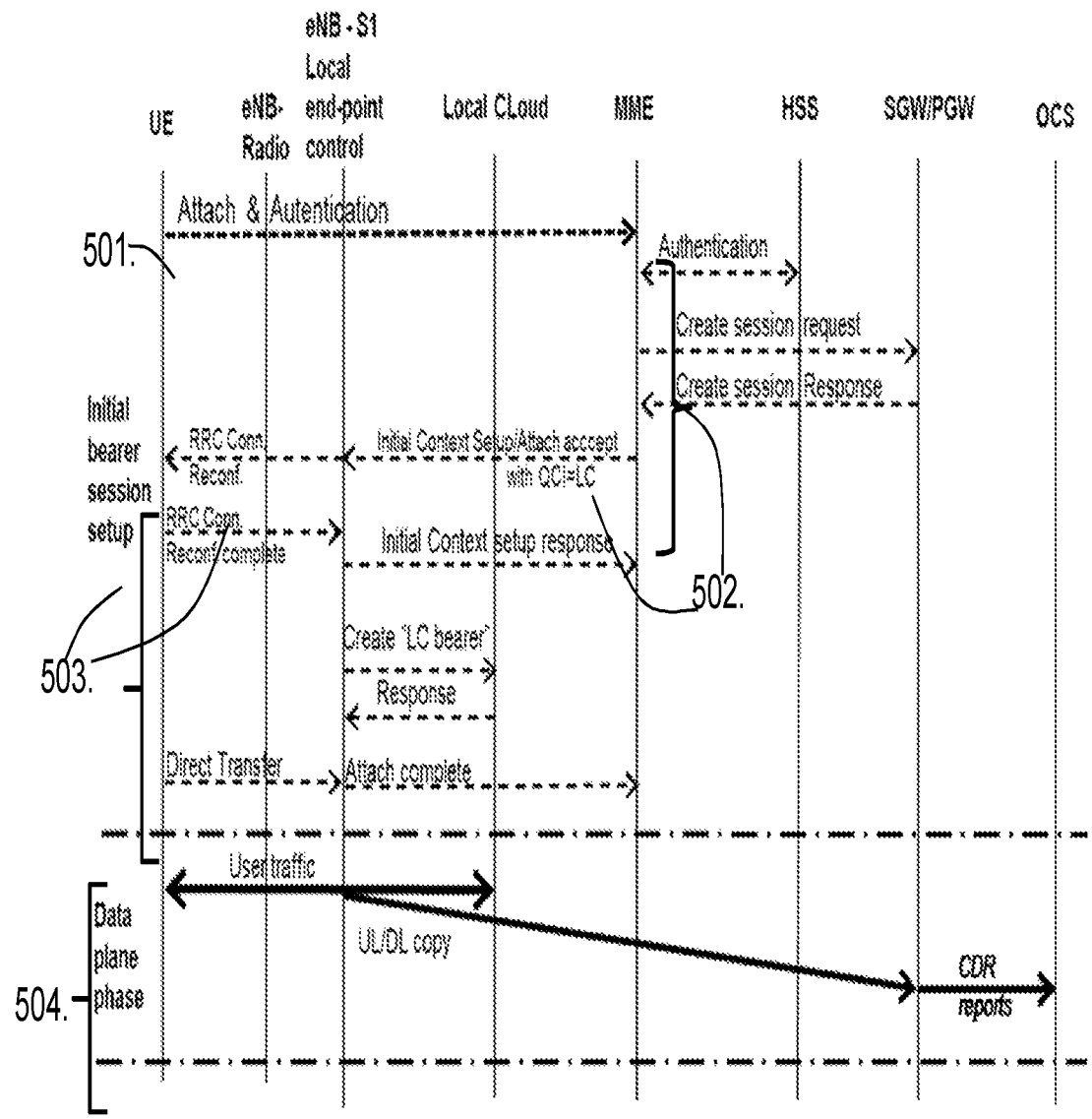
FIG. 5 is a sequence diagram depicting embodiments of a method in a communications network.

FIG. 5 is a sequence diagram depicting an example of the method according to embodiments herein. The example scenario describes the wireless device 120 attaching to the network when subscriber profile is configured with QCI for the local cloud. The attach represent the initial attach to request connectivity to the communications network 100.

Action 501.

Figure 6:
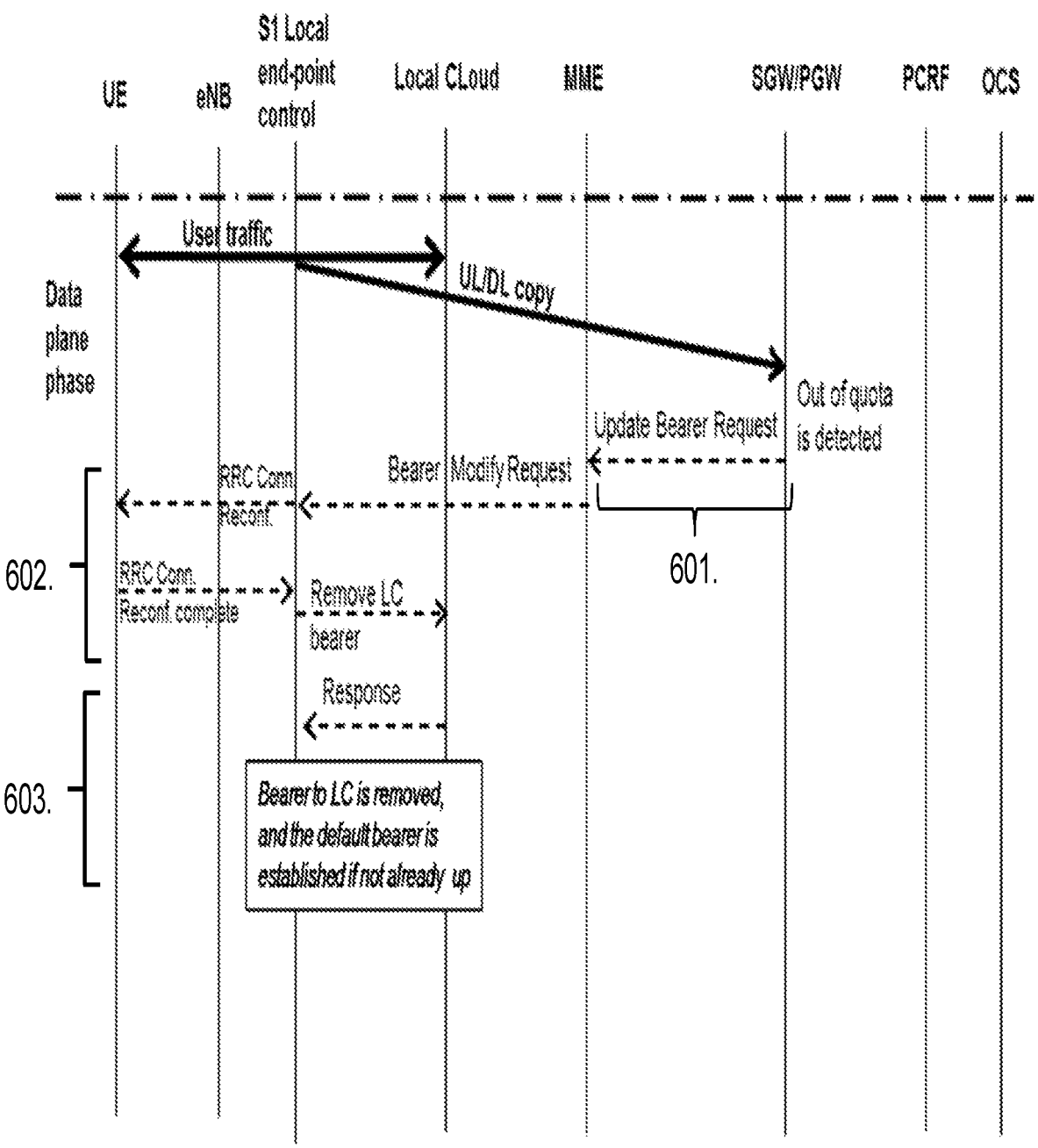
FIG. 6 is a sequence diagram depicting embodiments of a method in a communications network.
Figure 7:
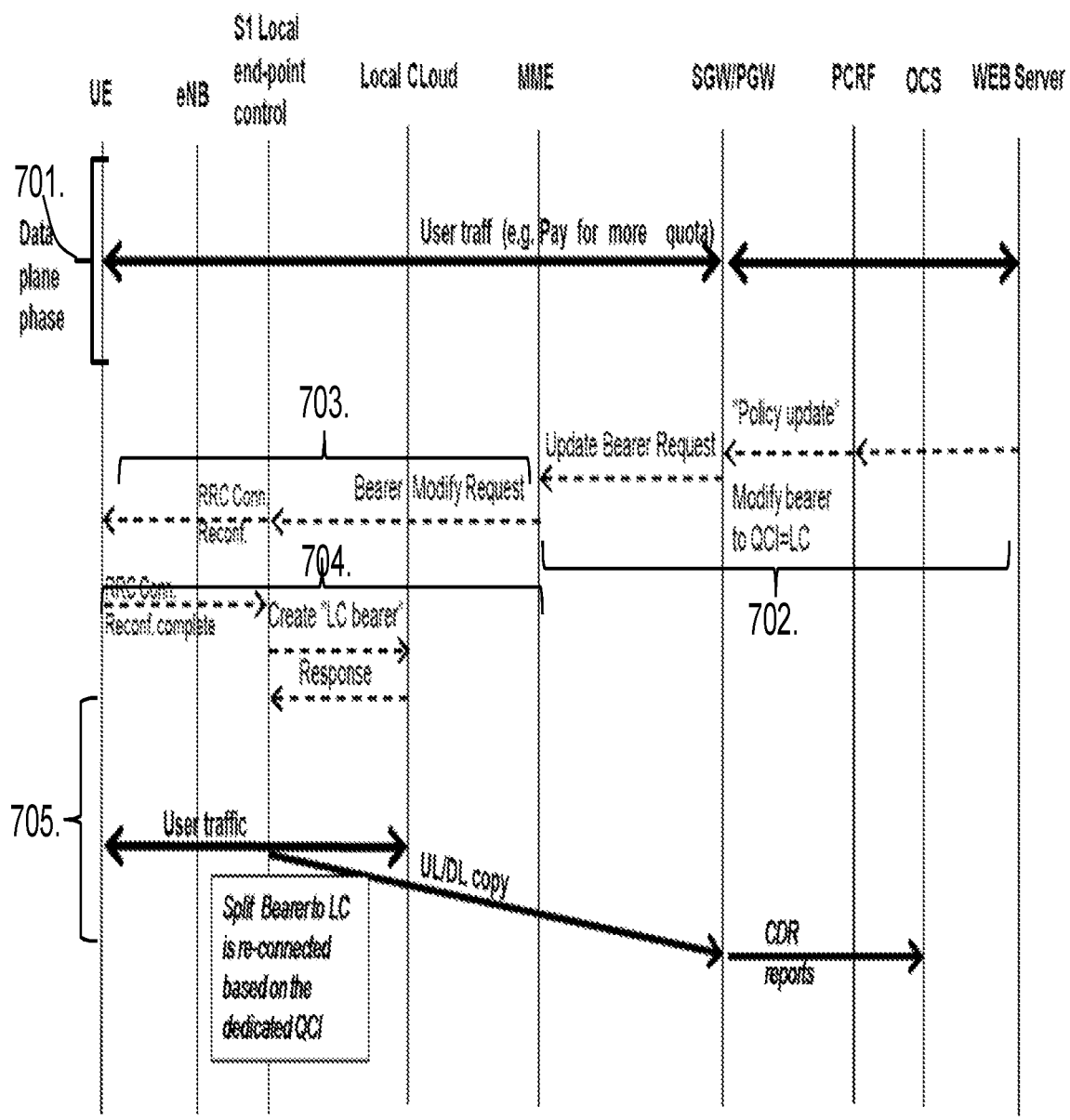
FIG. 7 is a sequence diagram depicting embodiments of a method in a communications network.

The wireless device 120 referred to as UE in FIG. 5-7. initiates the Attach procedure by transmitting to the base station 110, referred to as eNB in FIG. 5-7, of an Attach Request message that is forwarded to the core network node 130 referred to as MME in FIG. 5-7, as described in TS 23.401.

Action 502.

The core network node 130 e.g. the MME makes an authentication security procedure with a HSS. If OK the corer network node 130, e.g. the MEE sends an Update Location request to the HSS that replies with an "Update Location acknowledge" that holds the information of the "Subscription Data" comprising one or more PDN subscription contexts. Each PDN subscription context may also comprise an EPS subscribed QoS profile with QCI value QCI=Local Cloud (LC) referred to as the first indicator above, that is included in the Initial Context setup/Attach accept message sent to the base station 110, e.g. eNB. The first indicator indicates that said user data traffic shall be routed to the local cloud 105. This relates to Actions 301, 401 and 402 above.

At a positive response from the Authentication the MME sends a session request to the SGW which is forwarded to PGW to establish the EPS bearer from the PGW and down to the eNB. If the Create session response is positive the MME sends an Initial connect setup and Attach except to configure the eNB side of the EPS bearer, network side and radio side.

An alternative, not shown in the sequence diagram, to set up the split-bearer with QCI=LC may be done with the wireless device 120 by a network initiated bearer establishment as described in TS 23.401, by sending a Dedicated EPS bearer context activation message from the core network to the wireless device 120. In this alternative with network initiated bearer establishment the QCI value does not need to be pre-defined in the HSS Subscriber data PDN connection context, as it can be provided explicit when a service is requested from an application system in the network. The differences is if the split-bearer shall be established at the wireless device 120 attach to have the bearer already established before a service request is done or if the split-bearer is set-up in a later stage when the service request is done from the wireless device 120 or from the core network as described above. If the subscriber is frequent user of local cloud deployed serves it is preferred to have the bearer established already at attach.

Action 503.

The base station 110, e.g. eNB sends an RRC Connection Reconfiguration to the wireless device 120 to setup the radio bearer, which the first bearer 111. The wireless device 120 replies with the RRC Connection Reconfiguration complete message. If the first indicator, e.g. the QCI value for that bearer is equal to the Local Cloud type QCI=LC, which it is in this exemplary scenario, a Create LC bearer request is sent to the local cloud 105. The second bearer to the gateway is already done in Action 502 at the message Create session request sent to SGW.

Action 504.

From this point after that the connection to Local Cloud is established the base station 100 routes all user data traffic routed on the first bearer 111 is forwarded to the local cloud 105 and a copy of the packets are sent in the uplink direction of the other part of the split-bearer, i.e. the second bearer 112 up to the gateway node 140, e.g. SGW and PGW, that will handle the wireless device 120 traffic according to the policy defined, e.g. data volume bucket count and CDR reporting as defined by the subscription profile. This relates to Action 302 above.

FIG. 6 is a sequence diagram depicting an example of the method according to embodiments herein. In this exemplary scenario all the resources in the limited volume are consumed e.g. during the ongoing user data traffic transmissions, also referred to as the resources in the limited volume associated with the wireless device 120 is out of quota. This is detected by the gateway node 140 that reports it to the core network node 130 which in turn informs the base station by sending another indicator to the base station 110.

Action 601.

During the data plane phase when the user data traffic related to the wireless device 120 is copied to the gateway node 140, e.g. SGW and/or PGW and when the gateway policy, e.g. PGW policy detects "Out of quota" for this subscription, an update bearer Request is sent to the core network node 130, e.g. the MEE to modify the Split bearer to a normal bearer, as defined in subscriber profile, in the most cases a default bearer, but also another dedicated bearer with a different QCI value than LC may be used. This refers to action 403 above.

Action 602.

The core network node 130, e.g. the MME sends a Bearer Modification request to the base station 110, e.g. the eNB and a normal RRC connection Configuration is sent by the base station 110 to the wireless device 120 to modify the bearer e.g. together with the second indicator, e.g. with QCI value corresponding to split bearer value, e.g. 169. This relates to Action 304 and 404.

Action 603.

At reception of the RRC Connection Reconfiguration complete message, the base station 110 such as e.g. the S1 local end point of the base station 110 initiates a Remove split bearer message to the LC. This relates to Action 304.

FIG. 7 is a sequence diagram depicting an example of the method according to embodiments herein. In the exemplary scenario the user data traffic is not routed to the local cloud 105, but the user of the wireless device 120 refills resources e.g. by purchasing some more a pre-paid subscription for its wireless device 120, so that the subscription comprises a further limited volume of resources for user data traffic. This also referred to as new quota is added. This is detected by the core network node 130 which informs the base station 110 by sending a further indicator to the base station 110. It is possibly implementation used in that the WEB server sends this information to the core network and in that way the core network node 130 detects it. The core network node 130 may also ask for the status to detect.

Action 701.

From this point, i.e. after Action 603, when the wireless device 120 has modified the bearer, the user data traffic continues without any wireless device user data traffic routed to the local cloud 105 and the normal 3GPP principles will follow, e.g. the gateway node 140, e.g. the PGW will re-route traffic to an internal WEB server of the operator to inform the wireless device 120 of the situation, i.e. that the wireless device 120 is out of quota. This relates to Action 305. This relates to Action 304 and 404.

Action 702.

When new quota is allocated, e.g. the user of the wireless device 120 makes an on-line payment of more quota, a WEB server will update the policy and charging rule functions in the system that sends an policy update to gateway node 140, e.g. the PGW with the new quota also referred to as new data bucket or resources of the limited volume is refilled. The gateway node 140, e.g. the PGW will check if the subscriber related to the wireless device 120 has the Split-bearer profile enabled and if so the gateway node 140, e.g. the PGW will send an Update Bearer Request to the core network node 130, e.g. the MME. This relates to Action 405.

Action 703.

2 The core network node 130, e.g. the MME sends an Bearer Modification Request with the third indicator, e.g. the QCI=LC to re-connect the Split Bearer to the base station 110, and the signaling flow continues as specified in 3GPP out to wireless device 120 where the wireless device 120 replies with am RRC Connection Reconfiguration Complete. This relates to Action 306 and 406.

Action 704.

When the base station 110, e.g. eNB receives a RC Connection Reconfiguration Complete with the third indicator such as the QCI=LC, the base station such as the S1 local end point control function in the base station 110, sends a Create LC bearer, i.e. the first bearer 111, to the local cloud 105.

Action 705.

At reception of a positive Response message of the Create LC bearer the user data traffic of the user plane on that bearer will be routed over the first bearer 111 to the Local Cloud 105 and all user plane packets from and to the wireless device is copied in the uplink direction to the gateway node 140, e.g. the SGW/PGW on the second bearer 112, that will handle the user data traffic of the wireless device according to the policy defined, e.g. bucket count and CDR reporting. This relates to Action 307.

Figure 8:
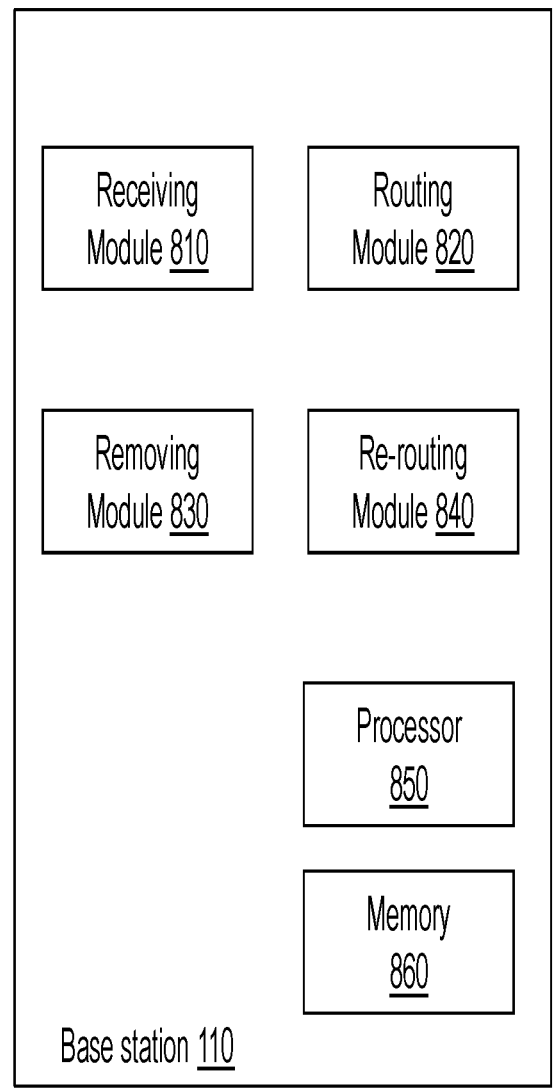
FIG. 8 is a schematic block diagram illustrating embodiments of a base station.

To perform the method actions for controlling user data traffic between a wireless device 120 and a local cloud 105, the base station 110 may comprise the following arrangement depicted in FIG. 8. As mentioned above, the wireless device 120 is configured to be associated with a limited volume of resources for user data traffic.

The base station 110 is configured to, e.g. by means of a receiving module 810 configured to, when it remains resources in the limited volume associated the wireless device 120, receive a first indicator from a core network node 130. The first indicator is configured to indicates that said user data traffic shall be routed to the local cloud 105.

The base station 110 is further configured to, e.g. by means of a routing module 820 configured to, route the user data traffic over a split bearer.

The split bearer is configured to comprises a first bearer 111 between the base station 110 and the local cloud 105 in which said user data traffic is to be routed. The split bearer is further is configured to comprise a second bearer 112 from the base station 110 to a gateway node 140. In the second bearer 112, a copy of said user data traffic is to be routed for measuring the volume of the user data traffic between the wireless device 120 and the local cloud 105 in relation to the limited volume for user data traffic associated with the wireless device 120.

The base station 110 may further be configured to, e.g. by means of the receiving module 810 configured to, when the limited volume associated with the wireless device 120 is run out of resources, receive a second indicator from the core network node 130. The second indicator is configured to indicate that the first bearer 111 between the base station 110 and the local cloud 105 shall be removed.

The base station 110 may further be configured to, e.g. by means of a removing module 830 configured to, remove the first bearer 111 between the base station 110 and the local cloud 105.

The base station 110 may further be configured to, e.g. by means of the routing module 820 configured to, route remaining user data traffic only over the second bearer 112 from the base station 110 to the gateway node 140.

The base station 110 may further be configured to, e.g. by means of the receiving module 810 configured to, when the limited volume associated with the wireless device 120 is refilled with resources, receive a third indicator from the core network node 130. The third indicator is configured to indicate that the remaining user data traffic shall be re-routed to the local cloud 105.

The base station 110 may further be configured to, e.g. by means of a re-routing module 840 configured to, re-route the remaining user data traffic over the split bearer.

The split bearer is configured to comprise a re-setup first bearer 111 between the base station 110 and the local cloud 105 in which said remaining user data traffic is to be routed, and said second bearer 112 from the base station 110 to the gateway node 140. In the second bearer 112 a copy of said remaining user data traffic is to be routed for measuring the volume of the user data traffic between the wireless device 120 and the local cloud 105 in relation to the limited volume of resources for user data traffic associated with the wireless device 120.

In some embodiments, the user data traffic or remaining user data traffic is to be routed over the second bearer 112 from the base station 110 to the gateway node 140. In these embodiments, the user data traffic or remaining user data traffic may comprise a fourth indicator configured to indicate whether or not this is copied user data traffic.

The fourth indicator may be configured to indicate that the user data traffic is not copied user data traffic, and wherein the fourth indicator further is configured to indicate that the remaining user data traffic on the second bearer 112 will not be further routed out from a core network.

As mentioned above, any one or more out of the first indicator, the second indicator, the third indicator and the fourth indicator may be comprised in a bearer context information.

Further any one or more out of the following alternative examples are applicable:

The first indicator is represented by a Quality Of Service, QoS, Class Identifier, QCI, with a first value indicating that said user data traffic shall be routed to the local cloud 105 over the first bearer 111, and a copy said user data traffic shall be routed to the gateway node 140 over the second bearer 112.

The second indicator represented by a QCI with a second value indicating that the first bearer 111 between the base station 110 and the local cloud 105 shall be removed, and that the second bearer 112 shall remain.

The third indicator is represented by a QCI with the first value indicating that said user data traffic shall be routed to the local cloud 105.

The fourth indicator is represented by a QCI with a fourth value indicating whether or not this is copied user data traffic.

The local cloud 105 may be represented by a Mobile Edge Cloud. The local cloud 105 may be configured to be located below a User Equipment, UE, Internet Protocol, IP, point of presence in an operators network, which operator serves the wireless device 120.

The embodiments herein may be implemented through one or more processors, such as a processor 850 in the base station 110 depicted in FIG. 8, together with computer program code for performing the functions and actions of the embodiments herein. The program code mentioned above may also be provided as a computer program product, for instance in the form of a data carrier carrying computer program code for performing the embodiments herein when being loaded into the base station 110 130. One such carrier may be in the form of a CD ROM disc. It is however feasible with other data carriers such as a memory stick. The computer program code may furthermore be provided as pure program code on a server and downloaded to the base station 110.

The base station 110 may further comprise a memory 860 comprising one or more memory units. The memory 860 comprises instructions executable by the processor 850.

The memory 860 is arranged to be used to store e.g. indicators, bearers set up for user data traffic, data, and configurations, to perform the methods herein when being executed in the base station 110.

In some embodiments, a computer program comprises instructions, which when executed by the at least one processor 850, cause the at least one processor 850 to perform actions according to any of the Actions 301-307.

In some embodiments, a carrier comprises the computer program, wherein the carrier is one of an electronic signal, an optical signal, an electromagnetic signal, a magnetic signal, an electric signal, a radio signal, a microwave signal, or a computer-readable storage medium.

Those skilled in the art will also appreciate that the modules in the base station 110, described above may refer to a combination of analog and digital circuits, and/or one or more processors 850 configured with software and/or firmware, e.g. stored in the memory 860, that when executed by the one or more processors such as the processor 850 as described above. One or more of these processors, as well as the other digital hardware, may be included in a single Application-Specific Integrated Circuitry (ASIC), or several processors and various digital hardware may be distributed among several separate components, whether individually packaged or assembled into a system-on-a-chip (SoC).

Figure 9:
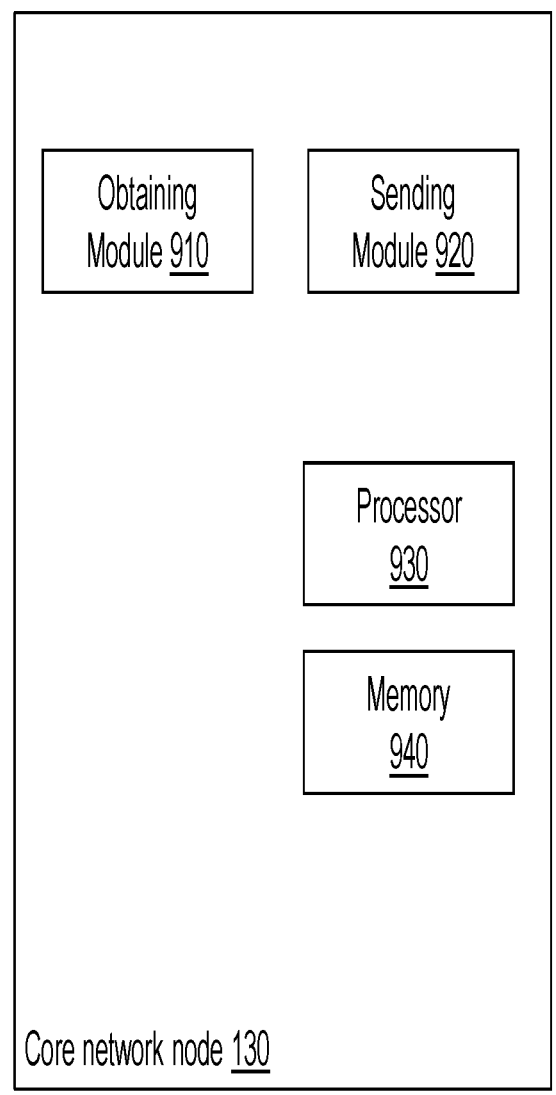
FIG. 9 is a schematic block diagram illustrating embodiments of a core network node.

To perform the method actions for controlling user data traffic between a wireless device 120 and a local cloud 105, core network node 130 may comprise the following arrangement depicted in FIG. 9. As mentioned above, the wireless device 120 is associated with a limited volume of resources for user data traffic.

The core network node 130 is configured to, e.g. by means of a obtaining module 910 configured to, obtain from a gateway node 140, information that it remains resources in the limited volume configured to be associated with the wireless device 120.

The core network node 130 is further configured to, e.g. by means of a sending module 920 configured to, send a first indicator to the base station 110, which first indicator is configured to indicate that said user data traffic shall be routed to the local cloud 105, and which first indicator adapted to instructs the base station 110 to route the user data traffic over a split bearer. The split bearer is configured to comprise a first bearer 111 between the base station 110 and the local cloud 105 in which said user data traffic is to be routed. The split bearer further comprises a second bearer 112 from the base station 110 to the gateway node 140, in which second bearer 112 a copy of said user data traffic is to be routed, for measuring the volume of the user data traffic between the wireless device 120 and the local cloud 105 in relation to the limited volume for user data traffic configured to be associated with the wireless device 120.

The core network node 130 may further be configured to, e.g. by means of the obtaining module 910 configured to, obtain from the gateway node 140, information that the limited volume configured to be associated with the wireless device 120 is run out of resources.

The core network node 130 may further be configured to, e.g. by means of the sending module 920 configured to, send a second indicator to the base station 110, which second indicator is configured to indicate that the first bearer 111 between the base station 110 and the local cloud 105 shall be removed. The second indicator is configured to instruct the base station 110 to remove the first bearer 111 between the base station 110 and the local cloud 105, and route the remaining user data traffic only over the second bearer 112 from the base station 110 to the gateway node 140.

The core network node 130 may further be configured to, e.g. by means of the obtaining module 910 configured to, when obtaining from the gateway node 140, information that the limited volume configured to be associated with the wireless device 120 is refilled with resources.

The core network node 130 may further be configured to, e.g. by means of the sending module 920 configured to, send a third indicator to the base station 110, which third indicator is configured to indicate that the remaining user data traffic shall be re-routed to the local cloud 105. The third indicator is configured to instruct the base station 110 to re-route the remaining user data traffic over the split bearer. The split bearer is configured to comprise a re-setup first bearer 111 between the base station 110 and the local cloud 105 in which said remaining user data traffic is to be routed, and said second bearer 112 from the base station 110 to the gateway node 140. In the second bearer 112 a copy of said remaining user data traffic is to be routed, for measuring the volume of the user data traffic between the wireless device 120 and the local cloud 105 in relation to the limited volume of resources for user data traffic configured to be associated with the wireless device 120.

In some embodiments, the user data traffic or remaining user data traffic is routed over the second bearer 112 from the base station 110 to the gateway node 140. In these embodiments, the user data traffic or remaining user data traffic comprises a fourth indicator indicating whether or not this is copied user data traffic.

The fourth indicator may be configured to indicate that the user data traffic is not copied user data traffic, and wherein the fourth indicator further is configured to indicate that the user data traffic on the second bearer 112 will not be further routed out from a core network of the core network node 130.

As mentioned above, any one or more out of the first indicator, the second indicator, the third indicator and the fourth indicator may be comprised in a bearer context information.

Further any one or more out of the following alternative examples are applicable:

The first indicator is represented by a Quality Of Service, QoS, Class Identifier, QCI, with a first value indicating that said user data traffic shall be routed to the local cloud 105 over the first bearer 111, and a copy said user data traffic shall be routed to the gateway node 140 over the second bearer 112.

The second indicator represented by a QCI with a second value indicating that the first bearer 111 between the base station 110 and the local cloud 105 shall be removed, and that the second bearer 112 shall remain.

The third indicator is represented by a QCI with the first value indicating that said user data traffic shall be routed to the local cloud 105.

The fourth indicator is represented by a QCI with a fourth value indicating whether or not this is copied user data traffic.

The local cloud 105 may be represented by a Mobile Edge Cloud. The local cloud 105 may be configured to be located below a User Equipment, UE, Internet Protocol, IP, point of presence in an operators network, which operator serves the wireless device 120.

The embodiments herein may be implemented through one or more processors, such as a processor 930 in the core network node 130 depicted in FIG. 9, together with computer program code for performing the functions and actions of the embodiments herein. The program code mentioned above may also be provided as a computer program product, for instance in the form of a data carrier carrying computer program code for performing the embodiments herein when being loaded into the core network node 130. One such carrier may be in the form of a CD ROM disc. It is however feasible with other data carriers such as a memory stick. The computer program code may furthermore be provided as pure program code on a server and downloaded to the core network node 130.

The core network node 130 may further comprise a memory 940 comprising one or more memory units. The memory 940 comprises instructions executable by the processor 930.

The memory 940 is arranged to be used to store e.g. indicators, bearers set up for user data traffic, data, and configurations, to perform the methods herein when being executed in core network node 130.

In some embodiments, a computer program comprises instructions, which when executed by the at least one processor 930, cause the at least one processor 930 to perform actions according to any of the Actions 401-406.

In some embodiments, a carrier comprises the computer program, wherein the carrier is one of an electronic signal, an optical signal, an electromagnetic signal, a magnetic signal, an electric signal, a radio signal, a microwave signal, or a computer-readable storage medium.

Those skilled in the art will also appreciate that the modules in the core network node 130, described above may refer to a combination of analog and digital circuits, and/or one or more processors 930 configured with software and/or firmware, e.g. stored in the memory 940, that when executed by the one or more processors such as the processor 930 as described above. One or more of these processors, as well as the other digital hardware, may be included in a single Application-Specific Integrated Circuitry (ASIC), or several processors and various digital hardware may be distributed among several separate components, whether individually packaged or assembled into a system-on-a-chip (SoC).

When using the word "comprise" or "comprising" it shall be interpreted as non-limiting, i.e. meaning "consist at least of".

The embodiments herein are not limited to the above described preferred embodiments. Various alternatives, modifications and equivalents may be used. Therefore, the above embodiments should not be taken as limiting the scope of the invention, which is defined by the appending claims.

Abbreviation Explanation

3GPP reference and selected abbreviations below http://www.3gpp.org/

Default Bearer: The EPS bearer which is first established for a new PDN connection and remains established throughout the lifetime of the PDN connection.

Split Bearer A new proposal in this IvD of an EPS bearer that is splitted in two parts from the eNB, one part as usual to S-GW and one part to a local cloud (MEC).

eNB evolved Node B
EPC Evolved Packet Core
EPS Evolved Packet System
E-RAB E-UTRAN Radio Access Bearer
E-UTRAN Evolved Universal Terrestrial Radio Access Network
GBR Guaranteed Bit Rate
GUMMEI Globally Unique MME Identifier
GUTI Globally Unique Temporary Identity
GW Gateway
OCS Online Charging System
OFCS Offline Charging System
LC Local Cloud as in e.g. Mobile Edge Computing (MEC)
L-GW Local GateWay
LIPA Local IP Access
MEC Mobile Edge Computing
MME Mobility Management Entity
MMEC MME Code
MTC Machine-Type Communications
M-TMSI M-Temporary Mobile Subscriber Identity
OMC-ID Operation and Maintenance Centre Identity
P GW PDN Gateway
PCC Policy and Charging Control
PCRF Policy and Charging Rules Function
PRA Presence Reporting Area
PDCP Packet Data Convergence Protocol
QCI QoS Class Identifier
S GW Serving Gateway
S-TMSI S-Temporary Mobile Subscriber Identity
SDF Service Data Flow
SIPTO Selected IP Traffic Offload
TAC Tracking Area Code
TAD Traffic Aggregate Description
TAI Tracking Area Identity
TAU Tracking Area Update

The invention claimed is:

1. A method performed by a base station, for controlling user data traffic between a wireless device and a local cloud, wherein the wireless device is associated with a limited volume of resources for user data traffic, the method comprising:
when the wireless device is associated with the limited volume of resources,
receiving a first indicator from a core network node, which first indicator indicates that said user data traffic shall be routed to the local cloud,
routing the user data traffic over a split bearer,
which split bearer comprises a first bearer between the base station and the local cloud in which said user data traffic is routed, and
which split bearer further comprises a second bearer from the base station to a gateway node, in which second bearer a copy of said user data traffic is routed, for measuring the volume of the user data traffic between the wireless device and the local cloud in relation to the limited volume for user data traffic associated with the wireless device,
wherein in the second bearer the copy of said user data traffic is routed from the base station to the gateway node without passing the local cloud,
wherein the user data traffic or remaining user data traffic is routed over the second bearer from the base station to the gateway node and wherein the user data traffic or remaining user data traffic comprises a fourth indicator, and
wherein the fourth indicator is represented by a Quality of Service Class Identifier (QCI), wherein the fourth indicator indicates that the user data traffic is not copied user data traffic, and wherein the fourth indicator further indicates that the remaining user data traffic on the second bearer will not be further routed out from a core network.

2. The method according to claim 1, further comprising:
when the limited volume associated with the wireless device is run out of resources, receiving a second indicator from the core network node, which second indicator indicates that the first bearer between the base station and the local cloud shall be removed,
removing the first bearer between the base station and the local cloud in which said user data traffic is routed, and
routing remaining user data traffic only over the second bearer from the base station to the gateway node,
wherein the second indicator is comprised in a bearer context information, and wherein the second indicator represented by a Quality of Service Class Identifier (QCI) with a second value indicating that the first bearer between the base station and the local cloud shall be removed, and that the second bearer shall remain.

3. The method according to claim 1, further comprising:
when the limited volume associated with the wireless device is refilled with resources, receiving a third indicator from the core network node, which third indicator indicates that the remaining user data traffic shall be re-routed to the local cloud, re-routing the remaining user data traffic over the split bearer, which split bearer comprises a re-setup first bearer between the base station and the local cloud in which said remaining user data traffic is routed, and said second bearer from the base station to the gateway node, in which second bearer a copy of said remaining user data traffic is routed, for measuring the volume of the user data traffic between the wireless device and the local cloud in relation to the limited volume of resources for user data traffic associated with the wireless device, wherein the third indicator is comprised in a bearer context information, and wherein the third indicator is represented by a QCI with the first value indicating that said user data traffic shall be routed to the local cloud.

4. The method according to claim 1, wherein the first indicator is represented by a Quality Of Service, QoS, Class Identifier, QCI, with a first value indicating that said user data traffic shall be routed to the local cloud over the first bearer, and a copy said user data traffic shall be routed to the gateway node over the second bearer.

5. The method according to claim 1, wherein the local cloud is represented by a Mobile Edge Cloud.

6. The method according to claim 1, wherein the local cloud is located below an UE Internet Protocol, IP, point of presence in an operators network, which operator serves the wireless device.

7. A method performed by a core network, for controlling user data traffic between a wireless device and a local cloud, wherein the wireless device is associated with a limited volume of resources for user data traffic, the method comprising:

obtaining from a gateway node, information that the wireless device is associated with the limited volume of resources for user data traffic, sending a first indicator to the base station, which first indicator indicates that said user data traffic shall be routed to the local cloud, which indicator instructs the base station to route the user data traffic over a split bearer, which split bearer comprises a first bearer between the base station and the local cloud in which said user data traffic is routed, and which split bearer further comprises a second bearer from the base station to the gateway node, in which second bearer comprises a copy of said user data traffic is routed, for measuring the volume of the user data traffic between the wireless device and the local cloud in relation to the limited volume for user data traffic associated with the wireless device, wherein in the second bearer the copy of said user data traffic is routed from the base station to the gateway node without passing the local cloud, wherein the user data traffic or remaining user data traffic is routed over the second bearer from the base station to the gateway node, and wherein the user data traffic or remaining user data traffic comprises a fourth indicator, and wherein the fourth indicator is represented by a Quality of Service Class Identifier (QCI), wherein the fourth indicator indicates that the user data traffic is not copied user data traffic, and wherein the fourth indicator further indicates that the remaining user data traffic on the second bearer will not be further routed out from a core network.

8. The method according to claim 7, further comprising:

obtaining from the gateway node, information that the limited volume associated with the wireless device is run out of resources, sending a second indicator to the base station, which second indicator indicates that the first bearer between the base station and the local cloud shall be removed, which second indicator instructs the base station to remove the first bearer between the base station and the local cloud in which said user data traffic is routed, and route remaining user data traffic only over the second bearer from the base station to the Gateway node, wherein the second indicator is comprised in a bearer context information, and wherein the second indicator represented by a Quality of Service Class Identifier (QCI) with a second value indicating that the first bearer between the base station and the local cloud shall be removed, and that the second bearer shall remain.

9. The method according to claim 7, further comprising:

when obtaining from the gateway node, information that the limited volume associated with the wireless device is refilled with resources, sending a third indicator to the base station, which third indicator indicates that the remaining user data traffic shall be re-routed to the local cloud, which third indicator instructs the base station to re-route the remaining user data traffic over the split bearer, which split bearer comprises a re-setup first bearer between the base station and the local cloud in which said remaining user data traffic is routed, and said second bearer from the base station to the Gateway node, in which second bearer a copy of said remaining user data traffic is routed, for measuring the volume of the user data traffic between the wireless device and the local cloud in relation to the limited volume of resources for user data traffic associated with the wireless device, wherein the third indicator is comprised in a bearer context information, and wherein the third indicator is represented by a QCI with the first value indicating that said user data traffic shall be routed to the local cloud.

10. The method according to claim 7, wherein the first indicator is represented by a Quality Of Service, QoS, Class Identifier, QCI, with a first value indicating that said user data traffic shall be routed to the local cloud over the first bearer, and a copy said user data traffic shall be routed to the gateway node over the second bearer.

11. The method according to claim 7, wherein the local cloud is represented by a Mobile Edge Cloud, MEC.

12. The method according to claim 7, wherein the local cloud is located below an UE Internet Protocol, IP, point of presence in an operators network, which operator serves the wireless device.

13. A base station for controlling user data traffic between a wireless device and a local cloud, wherein the wireless device is configured to be associated with a limited volume of resources for user data traffic, the base station being configured to:

when the wireless device is associated with the limited volume of resources, receive a first indicator from a core network node, which first indicator is configured to indicates that said user data traffic shall be routed to the local cloud, route the user data traffic over a split bearer, which split bearer is configured to comprises a first bearer between the base station and the local cloud in which said user data traffic is to be routed, and which split bearer further is configured to comprise a second bearer from the base station to a gateway node, in which second bearer a copy of said user data traffic is to be routed, for measuring the volume of the user data traffic between the wireless device and the local cloud in relation to the limited volume for user data traffic associated with the wireless device, wherein in the second bearer the copy of said user data traffic is routed from the base station to the gateway node without passing the local cloud, wherein the user data traffic or remaining user data traffic is to be routed over the second bearer from the base station to the gateway node and wherein the user data traffic or remaining user data traffic comprises a fourth indicator, and wherein the fourth indicator is represented by a Quality of Service Class Identifier (QCI), wherein the fourth indicator indicates that the user data traffic is not copied user data traffic, and wherein the fourth indicator further indicates that the remaining user data traffic on the second bearer will not be further routed out from a core network.

14. The base station according to claim 13, further being configured to:

when the limited volume associated with the wireless device is run out of resources, receive a second indicator from the core network node, which second indicator is configured to indicate that the first bearer between the base station and the local cloud shall be removed, remove the first bearer between the base station and the local cloud in which said user data traffic is routed, and route remaining user data traffic only over the second bearer from the base station to the gateway node, wherein the second indicator is comprised in a bearer context information, and wherein the second indicator represented by a Quality of Service Class Identifier (QCI) with a second value indicating that the first bearer between the base station and the local cloud shall be removed, and that the second bearer shall remain.

15. The base station according to claim 13, further being configured to:

when the limited volume associated with the wireless device is refilled with resources, receive a third indicator from the core network node, which third indicator is configured to indicate that the remaining user data traffic shall be re-routed to the local cloud, re-route the remaining user data traffic over the split bearer, and which split bearer is configured to comprise a re-setup first bearer between the base station and the local cloud in which said remaining user data traffic is to be routed, and said second bearer from the base station to the gateway node, in which second bearer a copy of said remaining user data traffic is to be routed, for measuring the volume of the user data traffic between the wireless device and the local cloud in relation to the limited volume of resources for user data traffic associated with the wireless device, wherein the third indicator is comprised in a bearer context information, and wherein the third indicator is represented by a QCI with the first value indicating that said user data traffic shall be routed to the local cloud.

* * * * *